United States Patent
Wolf et al.

(10) Patent No.: US 10,019,693 B2
(45) Date of Patent: Jul. 10, 2018

(54) WAREHOUSE RACK SPACE OPTIMIZATION

(71) Applicant: Lineage Logistics, LLC, Irvine, CA (US)

(72) Inventors: Elliott Gerard Wolf, San Francisco, CA (US); Christopher Frank Eckman, San Francisco, CA (US); Alexander James Woolf, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 15/280,985

(22) Filed: Sep. 29, 2016

(65) Prior Publication Data

US 2017/0091704 A1 Mar. 30, 2017

Related U.S. Application Data

(60) Provisional application No. 62/234,640, filed on Sep. 29, 2015.

(51) Int. Cl.
*A47F 1/04* (2006.01)
*G06Q 10/08* (2012.01)
(Continued)

(52) U.S. Cl.
CPC ......... *G06Q 10/087* (2013.01); *G06Q 10/043* (2013.01); *G06Q 10/063* (2013.01); *G06Q 10/08* (2013.01); *G06Q 50/28* (2013.01)

(58) Field of Classification Search
CPC .................................. A47F 1/04; B23P 19/00
See application file for complete search history.

(56) References Cited

U.S. PATENT DOCUMENTS 3,677,421 A 7/1972 Kintner
8,594,835 B2 11/2013 Lert et al.
(Continued)

FOREIGN PATENT DOCUMENTS

EP 1521194 4/2005

OTHER PUBLICATIONS

Lee et al., Optimal Design of Rack Structure With Modular Cell in AS/RS, Int. J. Production Economics 98 (2005) p. 172-78.*
(Continued)

*Primary Examiner* — Russell S Glass
(74) *Attorney, Agent, or Firm* — Fish & Richardson P.C.

(57) ABSTRACT

A system for optimizing storage racks in a warehouse that includes a plurality of storage racks that each include one or more horizontal bars that are adjustable along a plurality of elevations on the storage racks, placement of the one or more horizontal bars defining a plurality of rack openings within each storage racks; a historical inventory database that is programmed to store historical inventory data for the warehouse, the historical inventory data identifying pallets stored in the warehouse and times at which the pallets were stored; and a computer system including one or more processors that are programmed to determine a pallet distribution profile for the warehouse, to determine a plurality of rack types and quantity of rack types for the warehouse, and to designate each of the plurality of storage racks as one of the plurality of rack types to generate a rack arrangement for the warehouse.

18 Claims, 24 Drawing Sheets

(51) Int. Cl.
   *G06Q 50/28*  (2012.01)
   *G06Q 10/04*  (2012.01)
   *G06Q 10/06*  (2012.01)
   *B23P 19/00*  (2006.01)

(56) References Cited

U.S. PATENT DOCUMENTS

| | | |
|---|---|---|
| 8,918,750 B1 | 12/2014 | Moffitt |
| 2007/0156536 A1 | 7/2007 | Alfandary et al. |
| 2012/0061338 A1* | 3/2012 | Willick .............. G07F 17/0092 211/59.2 |

OTHER PUBLICATIONS

Gu et al., "Research on warehouse design and performance evaluation: A comprehensive review," European Journal of Operational Research, Jun. 2010, 203(3):539-549.

International Search Report and Written Opinion in International Application No. PCT/US2016/054551, dated Dec. 5, 2016, 12 pages.

Lee et al., "Optimal design of rack structure with modular cell in AS/RS," Int. J. Production Economics, Nov. 2005, 98(2):172-178.

Roodbergen et al., "A survey of literature on automated storage and retrieval systems," European Journal of Operational Research, Apr. 2009, 194(2):343-362.

Brandão et al., "Bin Packing and Related Problems: General Arc-flow Formulation with Graph Compression," Technical Report Series: DCC-2013-08, Sep. 26, 2013, 29 pages.

\* cited by examiner

400

Pallet Height Buckets

| | 20" | 50" | 100" |
|---|---|---|---|
| $t_1$ | 5 | 15 | 30 |
| $Agg_1$ | 50 | 45 | 3.0 |
| $t_2$ | 5 | 8 | 25 |
| $Agg_2$ | 38 | 33 | 25 |
| $t_3$ | 40 | 10 | 5 |
| $Agg_3$ | 55 | 15 | 5 |

| | | | |
|---|---|---|---|
| Max_Agg | 55 | 45 | 30 |
| Adj_Inv | 10 | 15 | 30 |

FIG. 4A

Consider a cardinality constrained bin packing instance with bins of capacity 7, cardinality limit 3, and items of sizes 5, 3, 2 with demands 3, 1, 2, respectively. This instance corresponds to adding cardinality limit 3 to Example 1.

a) We start with a graph with only the source node:

b) At the first iteration, we add arcs associated with the first item, which has weight 5. There is space only for one item of this size.

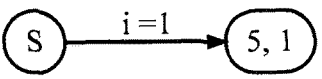

c) At the second iteration, we add arcs for the second item, which has weight 3. The demand does not allow us to form paths with more than 1 consecutive arc of this size.

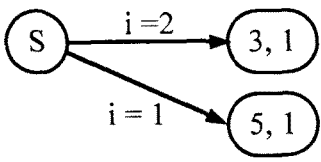

d) At the third iteration, we add the arcs associated with the third item, which has weight 2. Since the demand of this item is 2, we can add paths (starting from previously existing nodes) with at most 2 items of size 2.

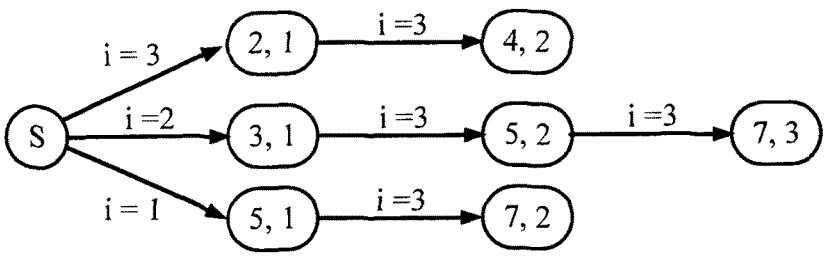

e) Finally, we add the loss arcs connecting each node, except the source, to the target. The resulting graph corresponds to the model to be solved by a general-purpose mixed-integer optimization solver.

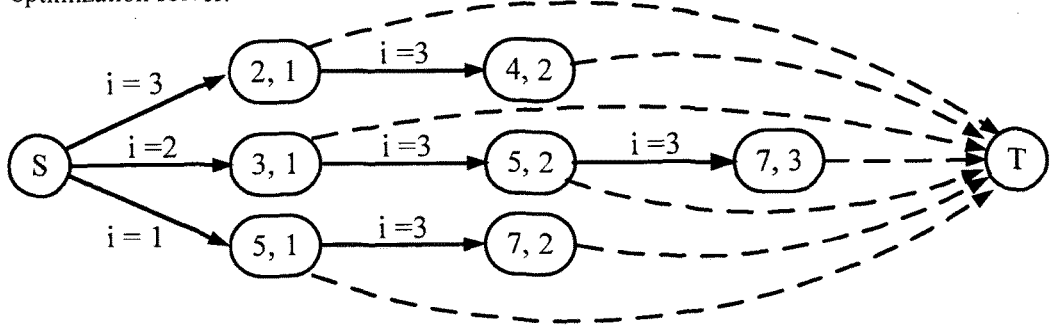

FIG. 21

WAREHOUSE RACK SPACE OPTIMIZATION

CROSS-REFERENCE TO RELATED APPLICATIONS

This application claims priority under to U.S. Provisional Patent Application No. 62/234,640, titled "RACK SPACE OPTIMIZATION," which was filed on Sep. 29, 2015, the entire contents of each of which are hereby incorporated herein by reference.

TECHNICAL FIELD

This document generally describes technology for optimizing the layout and use of racks for storing pallets and other physical goods in warehouses.

BACKGROUND

Warehouse racks are much like bookshelves in that they have a fixed outer shell with adjustable-height shelves. As with bookshelves, horizontal members (the rack levels, such as shelves) on a warehouse rack can be placed at arbitrary heights. Warehouse racks have been used with standard shelf heights to define rack openings that are uniform in size throughout a rack. For example, warehouse racks have traditionally been configured so that every rack opening has the same size.

Warehouse racks are used to store pallets of goods. Pallets are generally flat transport structures that support goods in a stable manner and that also include structures that are adapted to fit forklifts and/or other devices/machines to move pallets. Stacked on top of pallets are packages of various products. The weight and volume stacked on a pallet varies, resulting in a mix of heights for a given inventory profile. Warehouse racks have been configured so that the openings have a standard width and depth that will accommodate pallets being picked and put by forklifts or other machines/devices. The height of rack openings have traditionally been standardized as well, so that each opening is uniform and interchangeable.

SUMMARY

This document generally describes computer-based technology for optimizing warehouse racks—namely, setting of horizontal beams to designate rack opening of optimized sizes in racks to maximize storage density and a series of procedures to ensure that pallets are placed into the openings in order to maximize utilization of the available cube. Such rack optimizations can be performed using combinatorial optimization, such as bin-packing algorithms, based on historic and/or projected future pallets that will be stored at warehouses. For example, racks within a particular warehouse can be optimized to have openings that are sized to most efficiently store (e.g., minimize unused rack space that can exist in space gaps between the top of a pallet and shelf above the pallet) the particular sizes of pallets that have been and are projected to be stored at the particular warehouse—allowing for heights to be selected that maximize the storage density within the particular warehouse. Rack optimization can be performed based on particular warehouse considerations as well, such as equipment restrictions (e.g., forklift sizing requirements, forklift maximum reach, buffer for forklift use, warehouse dimensions, warehouse layout) and/or warehouse worker considerations (e.g., cap number of different sized bins to threshold level to reduce potential pallet placement and retrieval difficulties, allocation of bottom picking rows). In one implementation, a system for optimizing storage racks in a warehouse includes a plurality of storage racks that each include one or more horizontal bars that are adjustable along a plurality of elevations on the storage racks, placement of the one or more horizontal bars defining a plurality of rack openings within each of the storage racks; a historical inventory database that is programmed to store historical inventory data for the warehouse, the historical inventory data identifying, at least, pallets stored in the warehouse and times at which the pallets were stored; and a computer system including one or more processors that are programmed to: determine heights for the pallets based, at least in part, on the historical inventory data; generate a pallet distribution profile for the warehouse based on the pallet heights and the historical inventory data; generating a warehouse model that represents storage constraints related to the storage racks and equipment to place pallets in the storage racks; determine a plurality of rack types and a quantity of the rack types for the warehouse based, at least in part, on the pallet distribution profile and the warehouse model, the plurality of rack types each including a set of rack elevations for the horizontal bars defining a unique combination of sized rack openings for a rack; designating each of the plurality of storage racks as one of the plurality of rack types to generate a rack arrangement for the warehouse; and outputting information identifying the rack arrangement to be used for implementing the rack arrangement on the plurality of storage racks.

Such a system can optionally include one or more of the following features. Generating the pallet distribution profile can include determining distributions of the pallet heights over time based on the historical inventory data; evaluating a level of variation in the distributions over time; in response to determining that the level of variation exceeds a threshold level, aggregating and adjusting the distributions to generate the pallet distribution profile using a cumulative sum technique that accounts for the level of variation over time. The cumulative sum technique can include for each of the distributions and for each pallet height within the distributions, generating an aggregate value comprising a sum of an aggregate value for a next taller pallet and a value for the pallet in the distribution; for each of the pallet heights, identifying a maximum aggregate value across the distributions; and determining, for the pallet distribution profile, values for each of the pallet heights by determining, in sequential order from a tallest pallet to a shortest pallet, a value for a particular pallet as the difference between the maximum aggregate values for the next taller pallet and the particular pallet.

The pallet distribution profile can be generated further based on one more safety factors to protect against inventory surges and changes to pallet distributions. The safety factors can include one or more of: an inherent excess of pallet positions in the warehouse, an excess percentage of tall pallet positions, and excess lift at every pallet positions. The storage constraints can include one or more of: forklift performance features and limitations, roof and ceiling equipment constraints in the warehouse, and rack constraints. The forklift performance features and limitations can include one or more of: maximum reach of the forklift, presence of outrigger features and dimensions thereof for the forklift, and upright heights for the forklift. The roof and ceiling equipment constraints can include the minimum height above each of the storage racks defined by the roof or nearest ceiling equipment. The rack constrains can include vertical height of the horizontal bar and lift spacing needed to place and remove pallets from the storage racks.

The system can further include a warehouse management system that is programmed to perform the following operations to direct the equipment on the placement of a new pallet in the storage racks, as optimized by the rack arrangement: determining a height of the new pallet; identifying rack openings that are available for the new pallet; selecting one or more smallest rack openings into which the new pallet will fit; in response to selecting a plurality of smallest rack openings, selecting a particular rack opening from the plurality of smallest rack openings based on the locations of the plurality of the smallest rack openings with the warehouse; and transmitting information identifying the particular rack opening to the equipment for placement of the new pallet.

In another implementation, a system for using optimized storage racks in a warehouse includes a plurality of storage racks that each include one or more horizontal bars that are designated at optimal elevations along the storage rack to define rack openings that minimize unused rack space for a pallet distribution profile for the warehouse, wherein the elevations and size of rack openings are heterogeneous across the storage racks; a warehouse management system that is programmed to perform the following operations to instruct equipment on the placement of a new pallet in the optimized storage racks: determining a height of the new pallet; identifying rack openings that are available for the new pallet; selecting one or more smallest rack openings into which the new pallet will fit; in response to selecting a plurality of smallest rack openings, selecting a particular rack opening from the plurality of smallest rack openings based on the locations of the plurality of the smallest rack openings with the warehouse; and transmitting information identifying the particular rack opening to the equipment for placement of the new pallet.

Such a system can optionally include one or more of the following features. The equipment can include a forklift that includes a user interface programmed to automatically output the information identifying the particular rack opening in response to receiving the transmitted information. The particular rack opening can be selected based on the particular rack opening being closest to a pick line among the plurality of smallest rack openings. The particular rack opening can be selected based on the particular rack opening being closest to a bay where the new pallet is unloaded for storage in the warehouse or loaded onto a transportation channel for distribution from the warehouse.

In another implementation, a method for optimizing storage racks in a warehouse includes accessing, by a computer system, historical inventory data for the warehouse that identifies, at least, pallets stored in the warehouse and times at which the pallets were stored; determining, by the computer system, heights for the pallets based, at least in part, on the historical inventory data; generating, by the computer system, a pallet distribution profile for the warehouse based on the pallet heights and the historical inventory data; generating, by the computer system, a warehouse model that represents storage constraints related to storage racks and equipment to place pallets in the storage racks, wherein the storage racks each include one or more horizontal bars that are adjustable along a plurality of elevations on the storage racks, placement of the one or more horizontal bars defining a plurality of rack openings within each of the storage racks; determining, by the computer system, a plurality of rack types and a quantity of the rack types for the warehouse based, at least in part, on the pallet distribution profile and the warehouse model, the plurality of rack types each including a set of rack elevations for the horizontal bars defining a unique combination of sized rack openings for a rack; designating, by the computer system, each of the plurality of storage racks as one of the plurality of rack types to generate a rack arrangement for the warehouse; and outputting, by the computer system, information identifying the rack arrangement to be used for implementing the rack arrangement on the plurality of storage racks.

Such a method can optionally include one or more of the following features. Generating the pallet distribution profile can include determining distributions of the pallet heights over time based on the historical inventory data; evaluating a level of variation in the distributions over time; in response to determining that the level of variation exceeds a threshold level, aggregating and adjusting the distributions to generate the pallet distribution profile using a cumulative sum technique that accounts for the level of variation over time. The cumulative sum technique can include for each of the distributions and for each pallet height within the distributions, generating an aggregate value comprising a sum of an aggregate value for a next taller pallet and a value for the pallet in the distribution; for each of the pallet heights, identifying a maximum aggregate value across the distributions; and determining, for the pallet distribution profile, values for each of the pallet heights by determining, in sequential order from a tallest pallet to a shortest pallet, a value for a particular pallet as the difference between the maximum aggregate values for the next taller pallet and the particular pallet.

The pallet distribution profile can be generated further based on one more safety factors to protect against inventory surges and changes to pallet distributions. The safety factors can include one or more of: an inherent excess of pallet positions in the warehouse, an excess percentage of tall pallet positions, and excess lift at every pallet positions. The storage constraints can include one or more of: forklift performance features and limitations, roof and ceiling equipment constraints in the warehouse, and rack constraints. The forklift performance features and limitations can include one or more of: maximum reach of the forklift, presence of outrigger features and dimensions thereof for the forklift, and upright heights for the forklift. The roof and ceiling equipment constraints can include the minimum height above each of the storage racks defined by the roof or nearest ceiling equipment. The rack constrains can include vertical height of the horizontal bar and lift spacing needed to place and remove pallets from the storage racks.

The details of one or more embodiments are set forth in the accompanying drawings and the description below. Other features and advantages will be apparent from the description and drawings, and from the claims.

DESCRIPTION OF DRAWINGS

FIG. 4A is an example illustration of the technique depicted in FIG. 3 being performed on an example pallet height distribution that changes over time.

FIG. 21 depicts an example acrylic multigraph containing every valid packing pattern represented as a path form the source to the target.

Like reference symbols in the various drawings indicate like elements.

DETAILED DESCRIPTION

This document generally describes computer-based techniques for optimizing rack configurations at a storage facility and directing the putaway of inbound pallets to the right locations in an optimized rack configuration, such as an optimized configuration for warehouse racks. This document includes general discussions of this technology as well as an experimental implementation that illustrates the technology and various design considerations.

Figure 1:
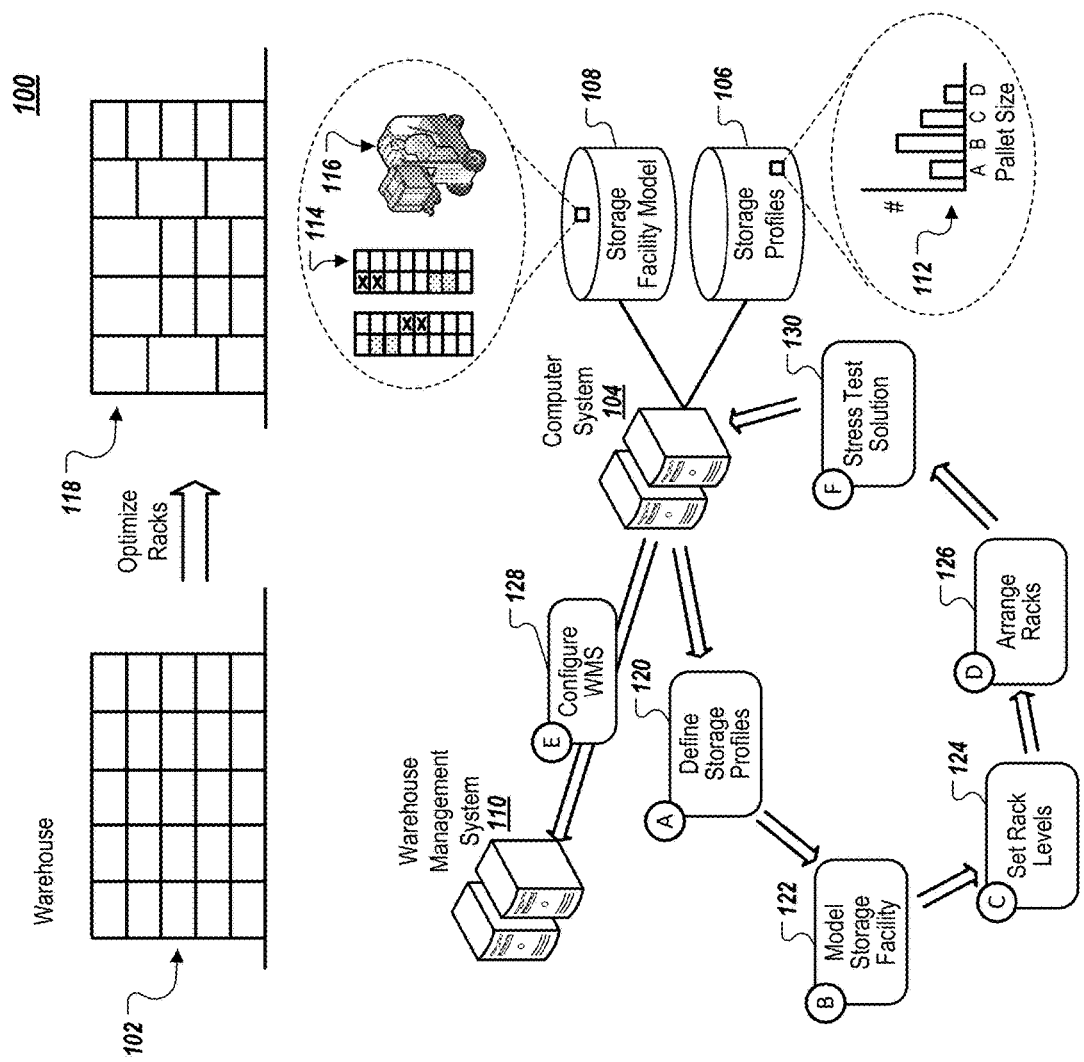
FIG. 1 depicts an example system for optimizing an example warehouse rack.

FIG. 1 depicts an example system 100 for optimizing an example warehouse rack 102. The example system 100 includes a computer system 104 (e.g., server system, cloud-based computer system, desktop, laptop, mobile computing device, other computing device/system) that is programmed to determine an optimized rack design for the rack 102 (and other racks) in a storage facility based, at least in part, on storage profiles 106 modeling the use of the facility (e.g., modeling the size and frequency of inventory stored at the facility over time) and facility models 108 modeling the racks available for optimization as well as physical constraints for the facility (e.g., ceiling height, forklift size and constraints).

For example, the storage profiles 106 can identify distributions of different sized pallets, as indicated by the example distribution 112 showing varying numbers of example pallet sizes A-D at a given time (or over a time range) that are stored at the facility. The facility can have one or more storage profiles, such as having multiple storage profiles that correspond to different companies/clients that use the facility and/or different products that are stored at the facility.

In another example, the storage facility model 108 includes a data model 114 of the racks to be optimized in the facility. The data model 114 can define the racks that are included in the facility. In the depicted example, the model 114 represents a top down view of the racks included in the facility, with each box representing a rack. The data model 114 can include information identifying, for example, the height of each of the racks, the layout of the racks relative to each other, racks that are missing from the configuration (indicated by an "X" through the box representing a missing rack, and racks which have ceiling obstructions overhead (e.g., HVAC equipment, lights, beams) (indicated by dots on the boxes). The data model 114 can additionally include information identifying forklifts 116 or other equipment used to pick and place pallets in the facility, along with the physical constraints of such equipment (e.g., size, maximum reach, presence of stabilization arms, size of stabilization arms). Other features can also be included in the data model 114.

The system 100 also includes a Warehouse Management System 110 (also referred to as "WMS") that is a specialized computer system to manage storage and retrieval of inventory at the facility, and to interface with devices and components within the facility, such as forklifts, sensors, HVAC systems, lighting systems, and/or other devices and components. For example, the WMS 110 can determine where pallets arriving at the facility should be placed (e.g., identifying rack opening for pallets), manage and track the locations of pallets, identify pallets that should be removed for shipment out of the facility, and communicate with forklifts (and other devices) to provide pick and place information for pallets.

The computer system 104 can determine an optimal design for the racks 102 that is specifically tailored to the storage profile(s) 106 for the facility and for the physical parameters of the facility (as indicated by the storage facility model 108). An optimal design is one in which the rack is able to accommodate all pallets at a given point in time (leaving minimal or no orphaned pallets that are unable to be stored because of all rack openings that will physically fit the pallet being filled) while minimizing unused rack space (space between the top of a pallet and the bottom of the next rack shelf above the pallet). For example, the racks 102 (presented as a front view of the racks 102) that are depicted are conventionally arranged so that each rack opening has the same size, as indicated by the consistent shelf height across the racks 102. In contrast, an example optimized rack 118 is depicted in which the rack openings are varied to maximize the use of the rack space (and to minimize the unused space) for the specific storage facility, its physical parameters, and its specific usage. The computer system 104 can determine customized optimizations storage facilities and may adjust them over time as the use of facilities changes over time (e.g., different products are stored at the facilities, different companies/client are using the storage facility).

The system 100 can optimize the rack 102 (to be have an optimized rack design 118) over a variety of different steps to identify optimized rack layouts and to efficiently use the optimized layouts. For example, rack optimization techniques performed by the system 100 and its components (e.g., computer system 104, WMS 110) can include:

(A, 120) defining a "reference distribution" of inventory (e.g., pallets) that is stored at a warehouse (or other storage facility) based on customer inventory patterns and margins of safety against changes to the distribution (e.g., determining the storage profile(s) 106 for the facility), which can be selected to to fit multiple observed distributions that may drift or vary over time, and which can be selected using any of a variety of techniques, such as a cumulative sum technique;

(B, 122) appropriately identifying and modeling constraints of a storage facility (e.g., warehouse), such as rack types, forklift limitations, etc. (e.g., determining the storage facility model 108);

(C, 124) setting rack levels to best pack the particular determined distribution for a warehouse into the rack system at the warehouse taking into consideration the specific constraints of the facility;

(D, 126) arranging the racks in order to facilitate several (often competing) objectives beyond cube utilization;

(E, 128) configuring the Warehouse Management System 110 that manages the warehouse to assign pallets to the correct openings that minimize wasted space and maximize storage density; and (F, 130) stress-testing the solution and sensitivities to certain constraints (forklifts, etc.) and repeating the design exercise as necessary.

Various terminology and notations are used in this document to describe these techniques, including the following symbols:

house's inventory as a whole, or it can be performed with regard to various customer, product, or other inventory groupings within the warehouse that can be combined together. Such determinations under the technique 200 can be based on any of a variety of appropriate factors, such as (1) the customer's historical inventory and how it changes over time (e.g., determined using cumulative sum technique), and (2) a "safety factor"—excess (usually tall) positions that exist in case the distribution and/or total inventory change.

At 202, historical inventory data for the warehouse can be accessed. For example, the WMS 110 (and/or affiliated computer systems) can maintain a database of inventory for the warehouse that identifies the inventory of the warehouse at various times that are accessed. Rack design can be based, in large part, on the profile of customer inventory at a warehouse, such as the height distribution of customer inventory (e.g., height distribution of customer pallets). For example, over time, a customer will bring pallets to the warehouse for storage and retrieve them out of the warehouse at a later date for delivery to a different location, which can result in a set $S_t$ of pallets in a warehouse at any particular time t.

At 204, the dimensions (e.g., height, width) of an individual pallet i in $S_t$, call it $h(S_{t,i})$, can be determined. For example, pallet height may be logged when pallets enter the warehouse, such as through laser scanning/measuring of the pallet height. In another example, pallet height can be computed based on the identity, quantity, and size of the goods included on the pallet, which can be determined, for example, using the following formula:

$$h(S_{t,i}) = \lceil qty(S_{t,i})/ti(p(S_{t,i})) \rceil \times caseht(p(S_{t,i})) + P$$

where:
$p(S_{t,i})$=the SKU (the product) on pallet $S_{t,i}$
$qty(S_{t,i})$=the quantity of cases on pallet $S_{t,i}$
$ti(p(S_{t,i}))$=the "ti" of the SKU represented by pallet $S_{t,i}$—the number of cases on a layer

| Symbol | Name | Example | Explanation |
|---|---|---|---|
| { } | Set | S = {123, 456} | The set S, a collection of elements (usually, for our purposes, a set of pallets in inventory), contains the elements 123 and 456 |
| ∪ | Union | S ∪ T | The Union of sets S and T - the set containing all elements of S and of T |
| \ | Relative Complement | S\T | The set of elements in S but not in T |
| f(x) | Function | f(123) | An arbitrary function of a number; f can be replaced with any letter or string of letters to denote distinct functions |
| ≤ | Element-wise inequality | x ≤ U | Each element of the vector x is less than or equal to the corresponding element of the vector U |
| ⌈ ⌉ | Ceiling | ⌈x⌉ | The smallest integer greater than or equal to x; ⌈5⌉ = 5 and ⌈5.2⌉ = 6 |

Defining Reference Distributions

Figure 2:
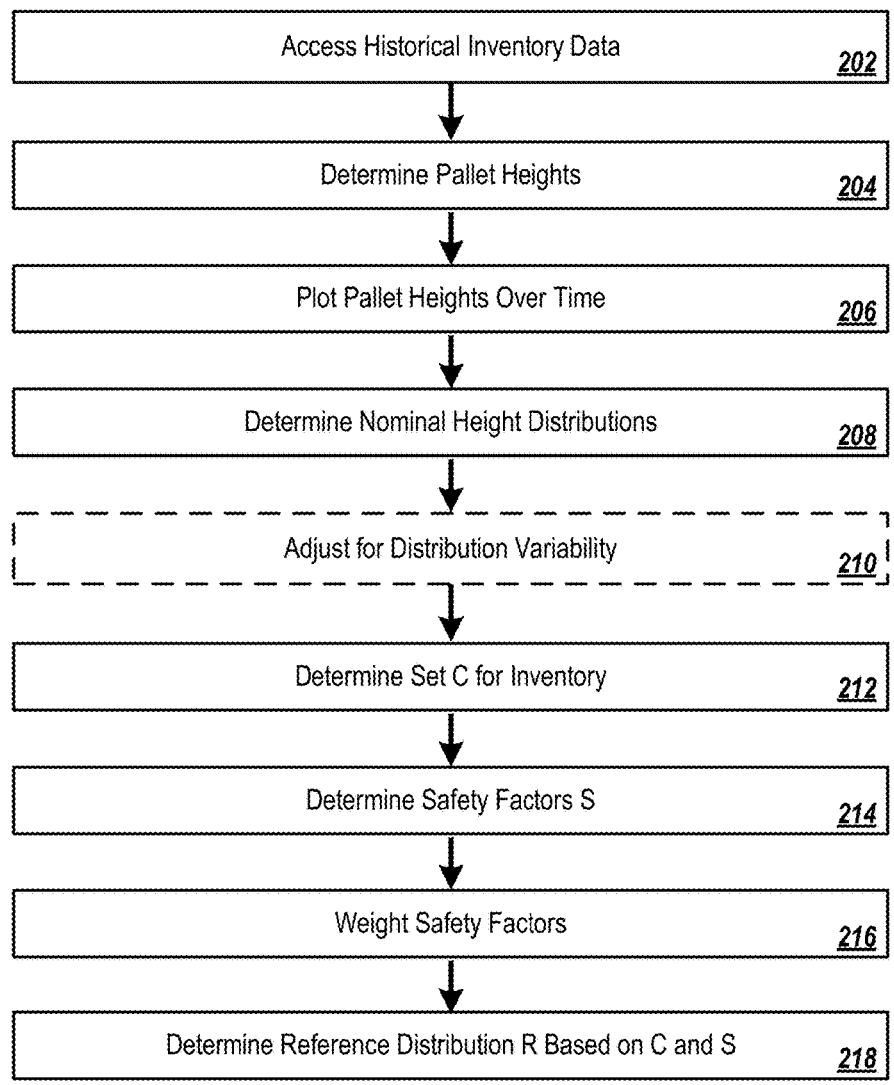
FIG. 2 is a flowchart of an example technique for determining reference distributions for a storage facility.

FIG. 2 is a flowchart of an example technique 200 for determining reference distributions for a storage facility. The technique 200 is an example of the step A (120) described above with regard to FIG. 1, and can be performed by any of a variety of appropriate computing devices, such as the computer system 104 and/or other computing devices/systems.

Figure 5:
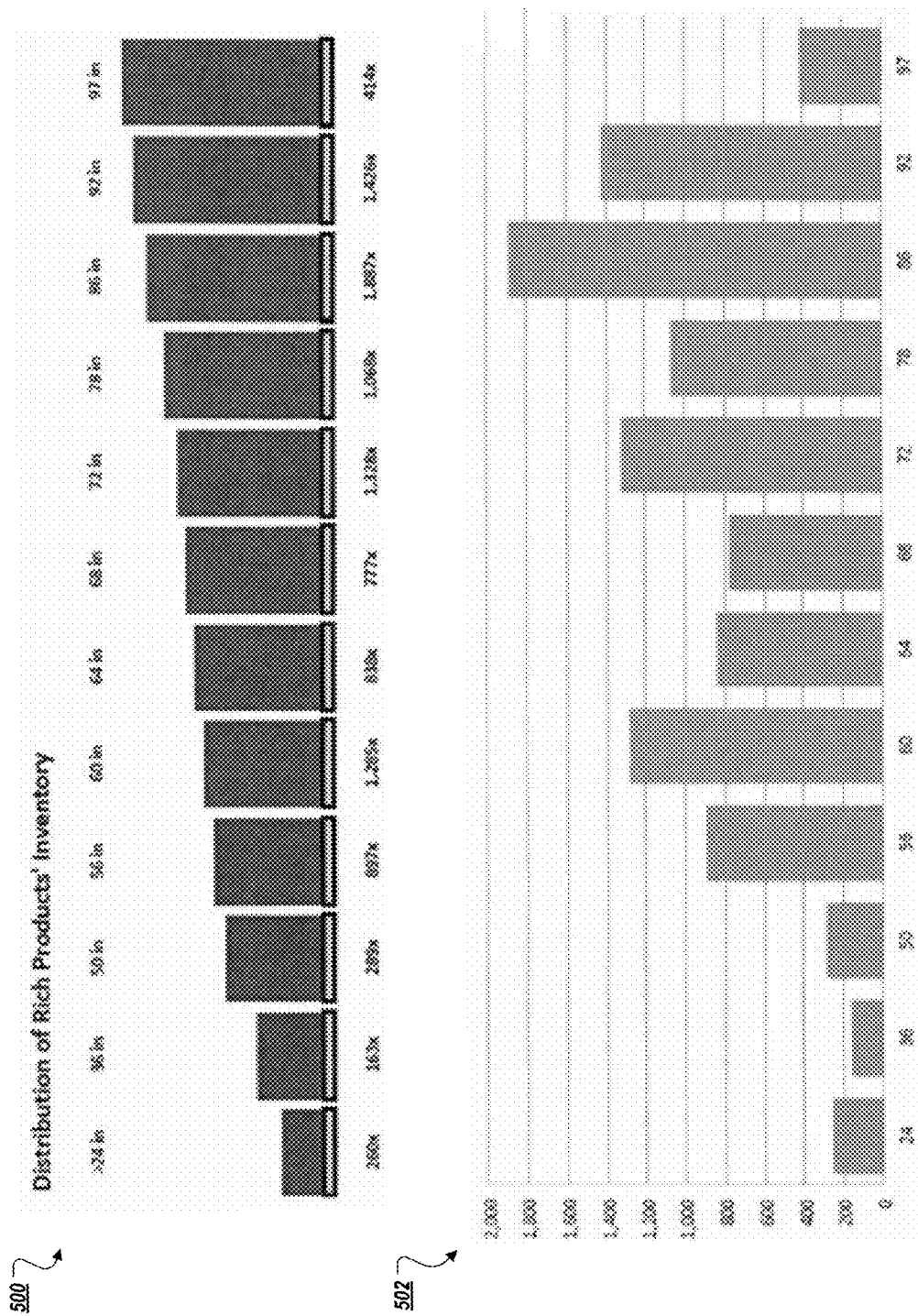
FIG. 5 depicts an example height distribution from an experimental use.

The technique 200 can provide an initial determination regarding a profile that is to be fit into a warehouse. The technique 200 can be performed with regard to the warehouse's caseht($p(S_{t,i})$)=the height of each cse of the SKU represented by pallet $S_{t,i}$
P=The height of an empty pallet usually 5 inches The number of layers on a pallet can be determined, for example, by identifying the quantity on the pallet and the number of cases per layer, then multiplying the number of layers by the case height, and adding the height of an empty pallet (e.g., pallet base). The distribution of the heights (and/or other dimensions, such as width and/or depth) of the pallets in $S_t$, the set of pallets in the warehouse at time t, can be used for modeling rack opening sizes that a warehouse should have to appropriately meet the storage needs of customers using the warehouse at a given time. For a particular t, the height (and/or other dimensions) of each pallet can be determined and the distribution of pallet heights can be plotted in any of a variety of appropriate data structures. FIG. 5 depicts an example height distribution of pallets in a warehouse from the experimental use. The table 500 depicts the relative heights of pallet buckets (groupings of pallets at various height intervals) with the number of pallets in the warehouse along the x-axis. The table 502 depicts the relative number of pallets at each of the buckets, with the height of each bucket along the x-axis.

At 206, inventory information (e.g., in and out transactions) can be analyzed and plotted over time to assess what size pallets were in a particular warehouse at every point over a period of time (e.g., years). This can provide a view into a variety of details that can be used to determine rack configurations, such as how the inventory profile has changed over time, how the distribution of heights has changed over time, and whether changes in the inventory distribution are associated with inventory level (or one-time inventory spikes). Other factors can also be gleaned from plotting data over time.

At 208, based on the above factors, nominal height distributions (e.g., for a warehouse, for customers) can be determined. For example, in the experimental implementation depicted in FIG. 5, the distribution was found to be remarkably stable over time, except for a one-time surge of 4,000 cheesecake pallets associated with a plant closure in early 2013. The cheesecake surge consisted of pallets almost entirely in the 72-76", changing the mix of pallet heights during that time. Due to its one-time nature, the spike in cheesecake pallets of a particular size (72-76") was discounted and not factored into a determination of the nominal height distribution. Such information may be taken into consideration with safety factors, as described below.

Optionally, variation in pallet height over time can be adjusted for (210), such as in instances where there is drift in the pallet height distribution over time and/or where there is seasonal variability in the pallet height distribution. For example, companies storing produce can have different storage needs depending on which crops are being harvested during a given season, which can cause the pallet height distribution for the storage facility storing the pallets to change seasonally. In another example, the business for various companies may change over time depending on changing product offerings and/or market demand, which can cause pallet height distributions stored by those companies to drift over time. Such variability (e.g., seasonal variation, drift) can affect the size of rack openings that are needed to accommodate the different pallet height distributions over time. An example technique for adjusting the profile to accommodate distribution variability is described below with regard to FIGS. 3-4 (example of a cumulative sum technique).

Figure 3:
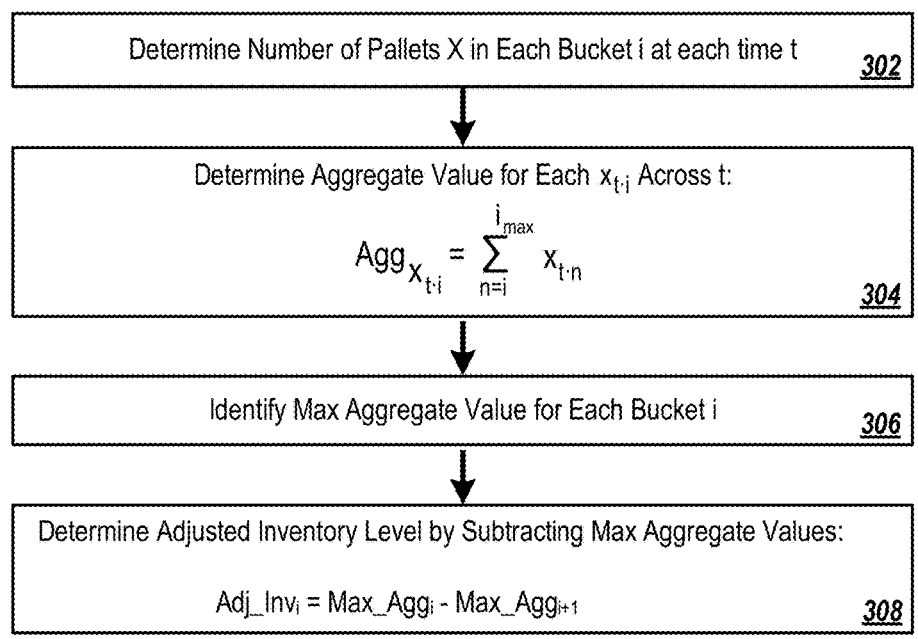
FIG. 3 is a flowchart of an example technique for adjusting a pallet distribution to account for variability over time.

FIG. 3 is a flowchart of an example technique 300 for adjusting a pallet distribution to account for variability over time. The technique 300 is an example of a cumulative sum technique described above for the step 210 with regard to FIG. 2, and can be performed by any of a variety of appropriate computing devices, such as the computer system 104 and/or other computing devices/systems. FIG. 4A is an example illustration 400 of the technique 300 being performed on an example pallet height distribution that changes over time.

At 302, the distribution of pallets over time is determined where the number of pallets $x_{it}$ are designated for each pallet height bucket i and at each time t. For example, in the example depicted in FIG. 4A, at time t1 there were 5 pallets in the 20" bucket, 15 pallets in the 50" bucket, and 30 pallets in the 100" bucket. However, this distribution of pallets becomes inverted by time t3 when there are 40 pallets in the 20" bucket, 15 pallets in the 50" bucket, and 5 pallets in the 100" bucket.

At 304, an aggregate value $agg_{it}$ is determined for each pallet height bucket i and at each time t. The aggregate values are determined across each time t from the tallest pallet bucket down to the shortest pallet bucket so that the aggregate value of the tallest pallet bucket ($i_{max}$) is simply its own value Xi_maxt) but the shortest pallet bucket (i=1) is the sum of all of the $x_{it}$ values for a given time t. For instance, as depicted in FIG. 4A, the aggregate value at t1 for the tallest bucket 100" is simply the number of pallets in the 100" bucket at that time (t1). Whereas the aggregate value for the middle bucket 50" at that time is the sum of the number of pallets in the 50" and 100" buckets at that time (t1). Similarly, the aggregate value for the smallest bucket 20" is the sum of the pallets at all heights at time (t1). Aggregation of the pallet counts from tallest to shortest buckets can take into account the fact that taller sizes could additionally accommodate the smaller pallet sizes.

At 306, a maximum aggregate value across all times t can be identified for each bucket i as $max\_agg_i$. For example, referring to the example in FIG. 4A, the maximum aggregate value for the 20" bucket is identified as 55 (time t3), the maximum aggregate value for the bucket 50" is identified as 45 (time t1), and the maximum aggregate for the bucket 100" is identified as 30 (time t1).

At 308, an adjusted distribution to account for distribution variability can be determined based on the maximum aggregate values. For example, the differences between maximum aggregate values for adjacent buckets can be subtracted in cascading order from tallest to shortest bucket to determine a number of pallet positions for that bucket. The resulting adjusted inventory values ($adj\_inv_i$) for each bucket can take into account all of the variability over the time range with the expectation that the taller buckets will be able to accommodate one or more of the shorter pallets when there are spikes in the number of shorter pallets. For example, referring to the example in FIG. 4A, the adjusted inventory value for the bucket 100" is 30 (same as the maximum aggregate value for the bucket 100"), the adjusted value for the bucket 50" is 15 (difference between the 50" and 100" bucket values), and the adjusted value for the bucket 20" is 10 (difference between the 20" and 50" bucket values).

Figure 4B:
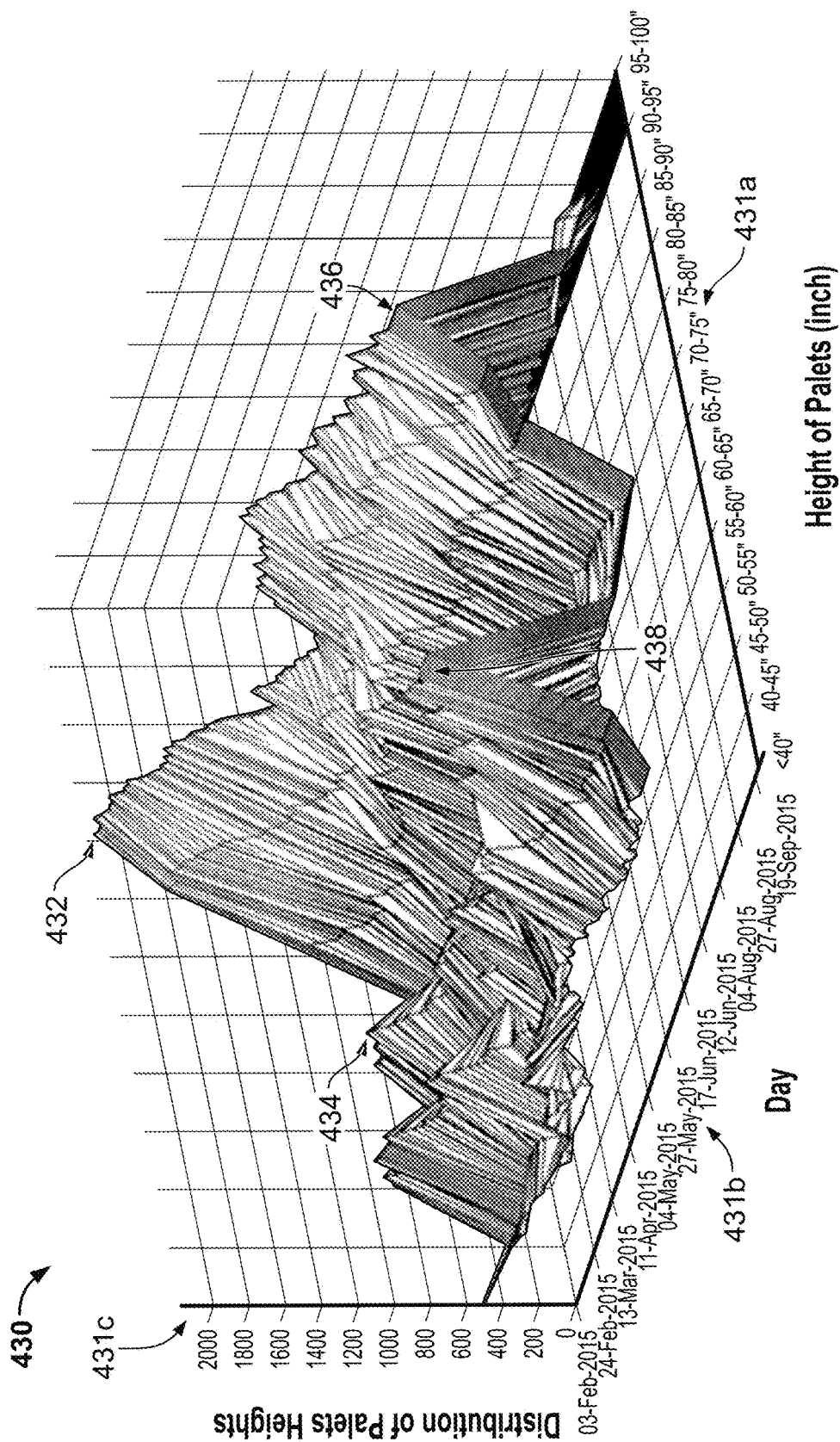
FIG. 4B is a three-dimensional graph showing example variation in pallet distributions for a storage facility over time.

FIG. 4B is a three-dimensional graph 430 showing example variation in pallet distributions for a storage facility over time. In particular, the x-axis (431a) for the graph 430 represents the pallet height buckets, the y-axis (431b) represents time, and the z-axis (431c) represents the distribution of pallets at the facility within the pallet buckets. As depicted in this example, the distribution of pallets at this facility changes over time. For example, at a first time depicted in the graph 430, the facility is storing a large number of tall pallets (around the 80"-85" bucket) as indicated by the spike 432 and a smaller number of shorter pallets (around the 55"-60" bucket) as indicated by the smaller spike 434. However, these distributions change so that there is nearly the same number of the tall pallets as there are of the shorter pallets at a last time depicted in the graph 430, as indicated by the spike 436 (around the 80"-85" bucket) being at nearly the same level as the spike 438 (around the 55"-60" bucket). The example technique 300 described above with regard to FIG. 3 (backward cumulative sum distribution) can account for and be used to determine pallet distributions that should be packed into a warehouse to accommodate the pallet height variations it is likely to experience over time.

Figure 4C:
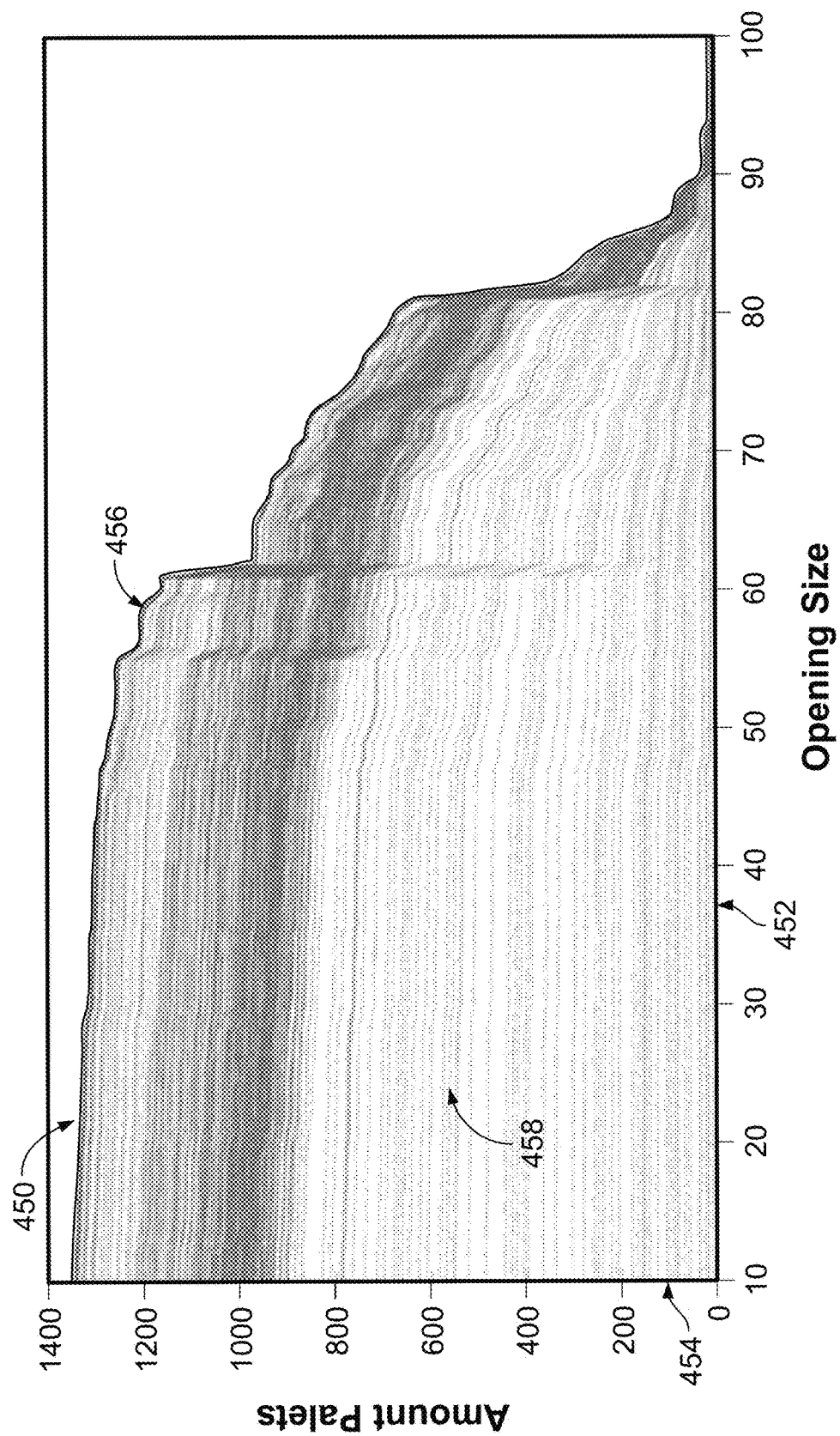
FIG. 4C is a graph showing an example of using a backward cumulative sum pallet distribution.

FIG. 4C is a graph 450 showing an example of using a backward cumulative sum pallet distribution (e.g., determined using the technique 300) to determine the distribution of rack openings for a facility (represented by line 456), and testing the determined distribution of rack openings against pallet distributions each day (represented by lines 458). The x-axis of the graph 452 represents the height of rack openings (for line 456) and the height of pallets (for lines 458), and the y-axis of the graph 452 represents the quantity of rack openings of a given height (for line 456) and the quantity of pallets of a given height (for lines 458). As depicted in this example, none of the pallet distributions represented by lines 458 extend beyond/above the line 456 (all of the lines 458 are bounded by the line 456)—meaning that the determined rack opening distribution (represented by line 456) is able to accommodate all of the varied distributions of pallets represented by lines 458.

At the end of the data science analysis of inventories, a set C of pallets representing a "typical" inventory (on a per customer basis, on a warehouse basis) can be determined (212). For example, in instances where there is less than a threshold level of variation over time, the nominal distribution can be designated as set C. In instances where there is at least a threshold level of variation, an adjusted distribution to account for variability (e.g., see FIGS. 3-4) can be designated as set C.

At 214, safety factors can be determined and used to guard against inventory surges and/or changes to the distribution of pallet heights in the warehouse. Safety factors can include several elements, such as:
- an inherent excess of pallet positions in the warehouse enabled by, for instance, a cube optimization exercise; even if one size of pallet sees an increase in representation, there can be enough pallet positions that fit it to prevent a problem;
- an excess percentage of tall pallet positions, which can hold pallets of any height, serving to absorb a change in the inventory distribution;
- excess "lift" left in every pallet position—effectively assuming that every pallet is larger than it really is to allow pallet heights to increase several inches without limiting our ability to store them; and
- Other appropriate factors.

Various weightings can be used to combine these above three elements (216). The size of the safety factor can be limited by the size of the facility relative to the size of the inventory.

For example, in the experimental implementation, extra weighting was provided to emphasize excess tall positions over building in excess lift to guard against another unexpected and unpredictable surge in a specific type of product (e.g., like the cheesecake surge). It was assumed that excess tall positions would facilitate in absorbing such unpredicted surges, but excess lift would not necessarily provide the same benefit. Additional consideration was taken to facilitate a picking program, which included leaving excess tall positions to provide flexibility to arrange pick pallets as to would minimize forklift transit time. Lastly, excess lift was assumed to be unnecessary because in the experiment there was a broad mix of pallets of almost every size, so should any one size bucket "blow out," the tall positions would ultimately absorb them.

In the experimental implementation, the facility was penciling out to be able to store approximately 14,000 pallets, with a nominal profile of 11,000 pallets. This 27% surplus was comfortable to absorb an inventory surge or a (potentially dramatic) change in distribution. Thus, even though a high percentage of ultra-tall pallets were most likely unnecessary, they were added as the following:
- Add approximately 1,000 ultra-tall pallets (97", the maximum that can fit in a truck) to the distribution as an additional safety factor and to facilitate flexibility in case-picking (S); and
- Change C to reduce the number of ultra-short (<=36") pallets and increase the number of medium-sized pallets (~80") to save cube via double-stacking short pallets.

At 218, a final reference distribution R can b be determined based on the inventory C for the facility and safety factor S. For example, the reference distribution R can be determined as:

$$R = C \cup S$$

Warehouse and Other Component Constraints

Figure 6:
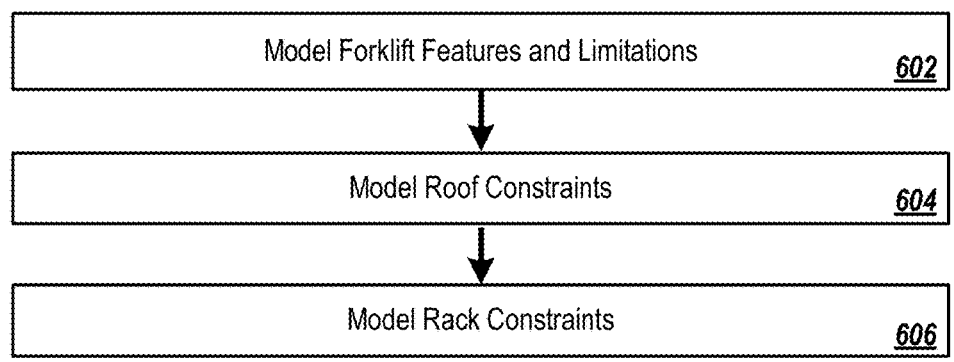
FIG. 6 is a flowchart of an example technique for accounting for and modeling various warehouse and other component constraints.

FIG. 6 is a flowchart of an example technique 600 for accounting for and modeling various warehouse and other component constraints. Various warehouse components have specific constraints that can be taken into account to identify not only rack configurations that will maximize storage density, but also configurations that will permit for them to still be used in a normal manner and with little effect on performance. The technique 600 is an example of the step 122 described above with regard to FIG. 1 for accounting for and modeling such constraints. The technique 600 can be performed by any of a variety of appropriate computing devices, such as the computer system 104 and/or other computing devices/systems.

At 602, forklift performance features and limitations can be modeled, such as maximum reach limitations, the presence of outrigger features, and upright heights. For example, there is a maximum "reach" for any forklift which is level beyond which the forks cannot reach. Further, as trucks age, their hydraulics deteriorate and this maximum level lowers over time (up to 4"). Maximum reach constraints require that the top level of the rack be lower than a certain level to allow a pallet to be manipulated. In the experimental implementation, the max reach was originally designated as 327" (these forklifts were subsequently replaced with different lift trucks to get to 341" to increase the pallet position count, see below). The clear height of the roof of the facility housing the experiment was approximately 451" on the south side, so max reach required a large pallet position at the top of each rack. The constraint in effect is that the top of the top beam must be lower than the max reach minus approximately 6", since the forklift lifts a pallet via the top of the inside of the pallet.

In addition, double-deep reach trucks used in this example type of warehouse can use an outrigger off the front to prevent the forklift from tipping over. This outrigger extends under the rack, necessitating a 4" bottom beam to hold up the bottom pallet and an approximately 6" gap between the beam and the floor. This effectively reduces the maximum lift of the forklift and the reach heights by 10".

Other limitations include upright heights. For example, in the experimental implementation, the type of racks that were used (double-deep reach manufactured by Advance Storage Products of Atlanta, Ga.) have free-standing vertical members (the "uprights") that are tied together by the horizontal rack levels. Those example uprights are 360" tall, higher than the max reach of the forklifts. If they were lower than the max reach of the forklifts, they would pose an additional constraint on the maximum height of the highest rack level.

Such forklift features and limitations can be added to a facility model, such as the storage facility model 108 described above with regard to FIG. 1.

Figure 7:
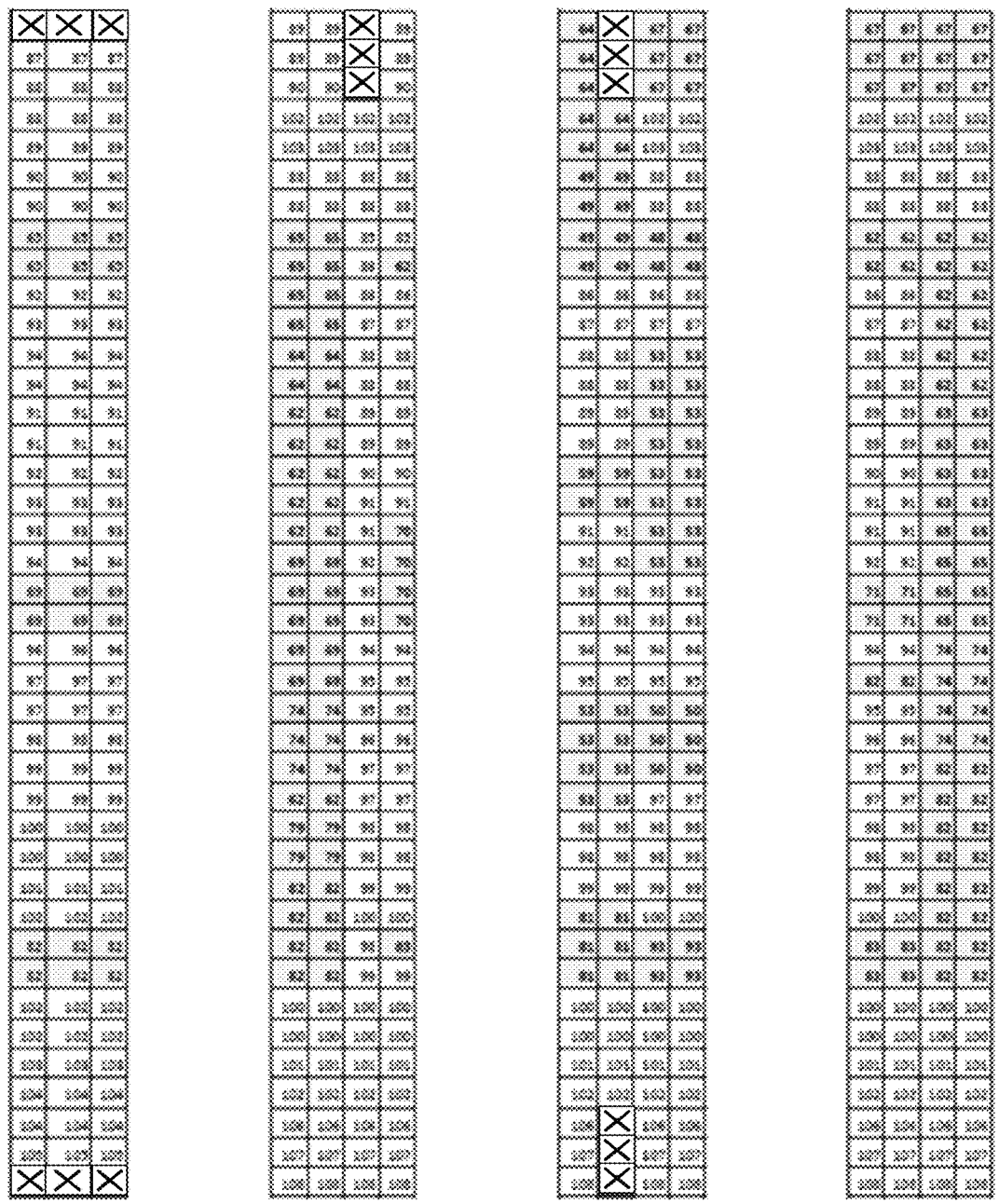
FIG. 7 depicts an example map of roof obstructions and missing racks in an example warehouse.

At 604, roof and ceiling constraints can be modeled (see FIG. 10B and corresponding description below). For instance, a warehouse can have a certain shape which, in the example implementation, included a roof sloped down to the north; the south side is 451" clear height, while the north side is approximately 420" clear height with a constant slope from south to north. Additionally, the facility used in the experimental implementation had several roof obstructions typical of refrigerated warehouses—suspended ammonia pipes, refrigeration coils, sprinkler pipes and other obstructions—that reduced the clear height further in certain areas. Obviously, forklifts and product cannot be permitted to collide with the roof or the roof obstructions, so these additional constraints needed to be taken into account. FIG. 7 depicts an example map modeling roof obstructions above shaded racks and missing racks (identified with an 'x') in an example warehouse.

At 606, rack constraints can be modeled. For example, lift and rails on racks can be another factor that needs to be taken into consideration. For example, each rack level can use a beam that occupies additional cube. Each beam can be, for instance, 4" tall. In addition, for each beam level, an additional 4" of empty space can be needed between the top of the pallet and the bottom of the beam above it to allow the forklift to manipulate (e.g., lift, remove, insert) the pallet into a bin. Other rack features can also be modeled.

Such rack features and limitations can be added to a facility model, such as the storage facility model 108 described above with regard to FIG. 1.

Setting Rack Elevations

A standard North American pallet has a footprint of 40"×48", which means that the variability can primarily be in the pallet height. Further, warehouses can have rack footprints that are fixed and the number of racks can be fixed according to the floor layout (assume n racks). Accordingly, the z (height) dimension of rack openings (defined by the positioning of rack shelves) can be varied to optimize rack configurations (e.g., select a mix of different rack opening heights for the racks and then arrange the elements of the mix to minimize the number of racks that are used and, as a corollary, to maximize storage density across a storage facility).

For example, in the experimental implementation the example constraints (e.g., determined using the technique 600) for setting rack elevations included:

Bottom beam height+bottom beam thickness b (10" in example facility)

Beam height+lift d (8" per level dead space)

Top beam height t (335")

Roof height n at position i (varies at example facility)

Figure 8:
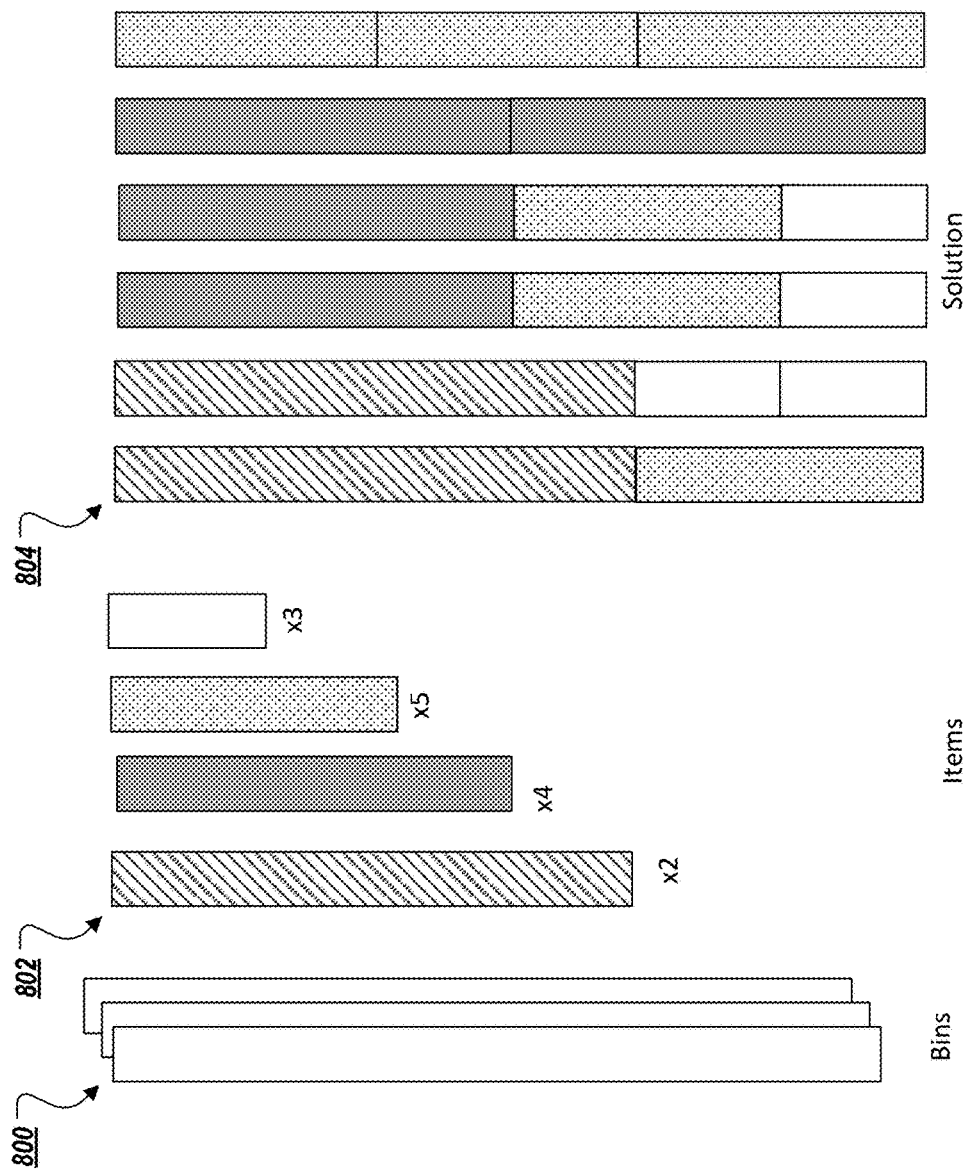
FIG. 8 depicts a 1-dimensional bin-packing setup with the objective being to pack a set of items into as few bins as possible.

In setting rack elevations to define the size of rack openings, the objective can be to assign the elements of P into racks while complying with the above constraints as to minimize the number of racks needed to store all elements of P. This can effectively maximize storage density since the inventory in P is crammed into the smallest possible floor area. Techniques used to make this determination can be similar to a one-dimensional bin-packing problem, for which there are various algorithms available that provide an exact solution. For example, FIG. 8 depicts an example 1-dimensional bin-packing setup with items 802 of various sizes and quantities to be stored into the bins 800, with the objective to pack the items 802 into as few bins 800 as possible. An example solution 804 is depicted in which all of the items 802 are fit into six of the bins 800. Any of a variety of combinatorial optimization techniques, such as bin-packing algorithms, can be used to identify an optimal arrangement (solution 804) of the items 802 so as to minimize the number of bins 800 that are used to fit all of the items 802 can attempt various combinations of items 802 in the bins 800 until a sufficiently optimal/efficient arrangement is identified.

Similar to identifying an optimal arrangement of the items 802 in the bins 800, the arrangements of rack openings (defined by the position or elevation of rack shelves) in racks (vertical columns within which several rack openings are arranged) can be determined using various combinatorial optimization techniques. Applying the terminology from the example in FIG. 8 to rack optimization, the racks can be the bins 800, the size and quantity of rack openings for a storage facility (determined as described above) can be the items 802, and the optimal arrangement of rack openings in the racks in the warehouse can be the solution 804. For example, the pallet distribution determination (as described above with regard to step 120 in FIG. 1 and FIGS. 2-5) can be used to identify the size/height and quantity of rack openings that are needed to accommodate the storage profile for the facility and its customers/clients/inventory over time. Combinatorial optimization techniques can be used to determine which combinations of differently sized rack openings will provide the optimal arrangement within the racks at a storage facility (ea However, several deviations and modifications to a conventional bin-packing setup can used to appropriately accommodate the various constraints and factors to effectively identify optimized rack configurations. For example, such deviations and modifications include:

(1) The lift and beam height imposing a penalty for packing each item in a bin;

(2) The roof line implying that the use of bins (racks) of different sizes; and (3) The max lift of the forklift needing at least one "tall" pallet be assigned to each bin, with the set varying with the size of the "bin" (rack) as defined (at the top) by the roof line.

Figure 9:
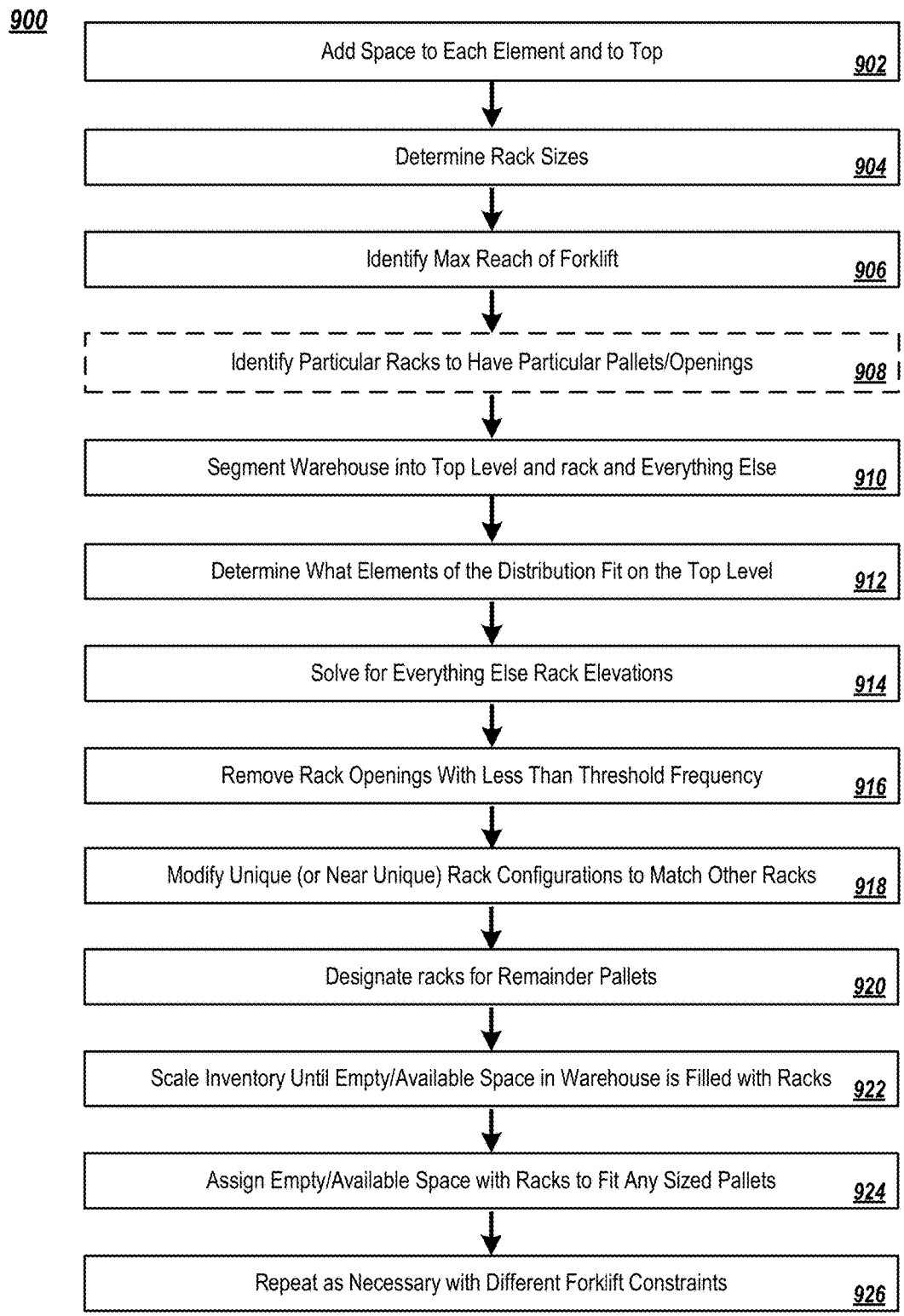
FIG. 9 is a flowchart of an example technique for determining optimal configurations of rack openings within racks at a storage facility using modified bin-packing techniques.

FIG. 9 is a flowchart of an example technique 900 for determining optimal configurations of rack openings within racks at a storage facility using modified bin-packing techniques. The technique 900 is an example of the step 124 described above with regard to FIG. 1 for setting rack levels (defining rack openings) within a storage facility. The technique 900 can be performed by any of a variety of appropriate computing devices, such as the computer system 104 and/or other computing devices/systems.

At 902, the first point (1) can be addressed by adding needed dead space to each element of P and adding 4" to the roof line to account for the lack of a bar over the top pallet. Dead space can be additional space above a pallet that is needed for a forklift to pick and place pallets in rack openings. A rack opening cannot have the exact same dimensions as a pallet, otherwise the pallet could not be readily pick or placed in the rack opening by a forklift (or other devices/machines). Additional height can be added to the top row since a bar does not overhang it to consume a portion of the vertical space within the rack.

At 904, the rack sizes (bins) can be determined using the facility model (e.g., storage facility model 108), which defines dimensions, types, and locations of the racks, as well as the vertical height of each rack (bin) as defined by the varied rooflines for the storage facility. For example, the rack sizes in which the rack levels can be determined (to define the rack openings) can vary across a facility, which can increase the number of permutations that are considered since the racks (bins) are not of a standard height.

At 906, the maximum reach of the forklift can be identified using the facility model (e.g., storage facility model 108). For example, the maximum reach may define a maximum height at which the top shelf may be placed, which may also define the height of the top rack opening (further defined by the roofline). This can additionally increase the number of permutations for consideration, especially with varied bin heights, because, instead of only considering which items (sized rack openings) are grouped together in a bin (rack), additional considerations are needed as to which bin those items are assigned to. For instance, in the experimental implementation, the top reach constraint was not so far from the roof line as to allow for placement of any-sized pallet on the top level. If the two constraints were so far apart that there was at least 102" between the top level and the roof line, then there would have effectively been identically-sized bins (pallet are need to be 97" to fit in a trailer). In the example warehouse that was used for the experiment, over a 102" difference was reached in approximately the middle of the room. The sloping roof and the remaining obstructions limited some positions on the top to as low as 60". Max lift (reach) constraints can be formulated within available vector packing algorithms, for example, based on graph theory (e.g., by pruning the tree before feeding to an example Gurobi solver).

Optionally, particular racks (bins) in a facility can be identified to receive particular pallets and corresponding rack openings to accommodate special considerations within the facility (908). For example, as discussed below in the section regarding arranging the racks, additional benefits can be gained from having many degrees of freedom in arranging the racks once the elevations of rack shelves (defining the size of openings in a rack) and the counts of each type of elevation are determined (e.g., using a modified bin packing technique). Those degrees of freedom can, among other things, allow for (a) the results of a separate optimization exercise designed to minimize the travel-time of order pickers and (b) various product-specific requirements to maintain certain products in certain temperature zone to be incorporated into the determination of appropriate rack configurations. However, if bin-packing is performed with different-sized bins (based on varied roof heights throughout a warehouse), then additional constraints added in regarding whether a particular bin (a particular rack) goes in a particular area of the warehouse, such as areas that have a certain height, a certain temperature condition (e.g., more consistent temperature throughout the day than other parts), and/or a certain location relative to parts of the storage facility (e.g., close to loading doors). Such constraints can be added in to the model to allow for special circumstances, to the extent they may exist within a facility, to be accommodated and satisfied when determining the elevations for the racks in the warehouse.

Max lift constraints should be able to be formulated within available vector packing algorithms based on graph theory (e.g., by pruning the tree before feeding to an example Gurobi solver), but doing so may require significant effort and yield marginal benefit given the inability to incorporate the roof-line constraint. Accordingly, a simplifying assumption can be made, as described below with regard to step 912 and FIG. 10B.

At 910, a particular warehouse that is being analyzed can be segmented into two parts: the pallet positions on the top level of the racks and everything else. This can, in some instances, eliminate the need to consider the roof line and max lift modifications to the bin-packing algorithm altogether, and can allow for solving the "everything else" portion of the warehouse using any of a variety of appropriate combinatorial optimization techniques, such as a bin-packing technique.

At 912, the elements that will fit on the top level can be determined using any of a variety of techniques, and using the constraints/features identified in steps 902-908. For example, in the experimental implementation, the processes was started with the assumption that a not-bad place for the top level was the max reach of the forklift, less 6" for "lift off" (the forklift has to reach not to the top level, but to the top of the inside of the pallet). In the example warehouse for the experiment, that was 335", which gave a distribution on the top level on the high end of the pallet height distribution.

Additionally, in some instances a combinatorial optimization technique (e.g., bin-packer) can assign items to a bin (rack) that do not stack all the way to the maximum size constraint, allowing for some flexibility to place shorter racks on the shorter end of the building and under roof obstructions. Assuming that the top level is constant can allow the solver to pack below the top-level, which can leave the distribution of pallets on the top dictated by the roof height. Such a configuration can eliminate the need to consider the max reach constraint or solve using different-sized bins based on varied roof heights across a warehouse.

Regarding determining the pallets that will fit on the top level (step 912), the pallets in the reference distribution that fit "best" on the top level can be given priority to "live" up high on the top level. The best fit can be determined from the smallest possible separation between the size of a pallet position and the pallet in the position.

Recalling the reference distribution, $R = C \cup S$, the objective can be to pick the n pallets out of R that best fit on the top level and assume they will be on the top level of the racks. Then the remaining pallets can be vector-packed everywhere else. To assign pallets to the roof (top level), the following example "pseudocode" can be used:

---

Let T be the set of pallet positions on the top level with a top beam at our max reach constraint. Assume there are n pallet positions on the roof (something we know in advance given the rack layout). $h(T_i)$ is the maximum pallet height that can fit in position $T_i$. Represent $h(T_i)$ as a vector and sort its elements in descending order. Consequently $h(T_1)$ is the tallest pallet position on the top level and $h(T_n)$ is the shortest.

Assume R has m pallets in it. $h(R_j)$ is the maximum pallet height that can fit in position $R_j$. Represent $h(R_j)$ as a vector and sort its elements in descending order. Consequently $h(R_1)$ is the tallest pallet in the reference distribution and $h(R_m)$ is the shortest. We also define a vector $I_T(R_j)$ of indicators:

$$I_T(R_j) = \begin{cases} 1 & \text{if } R_j \text{ should be included on the top level} \\ 0 & \text{if } R_j \text{ should not be included on the top level} \end{cases}$$

We set $I_T(R_j) = 0 \forall j$ and begin with i = 1 and j = 1. While i ≤ n:
(1) If $h(R_j) \leq h(T_i)$ (pallet $R_j$ fits in top position $T_i$), then set $I_T(R_j) = 1$ and increment i and j
(2) if $h(R_j) > h(T_i)$ (pallet $R_j$ does not fit in top position $T_i$), then increment j (moving on to the next smallest pallet to try and fit into top position $T_i$)

Once this loop is completed, the n tallest pallets that can physically fit on the top-level have been assigned to the top level. Let Z be the set of pallets where $I_T(R_j) = 1$ (pallets that were assigned to the top level).

Figure 10A:
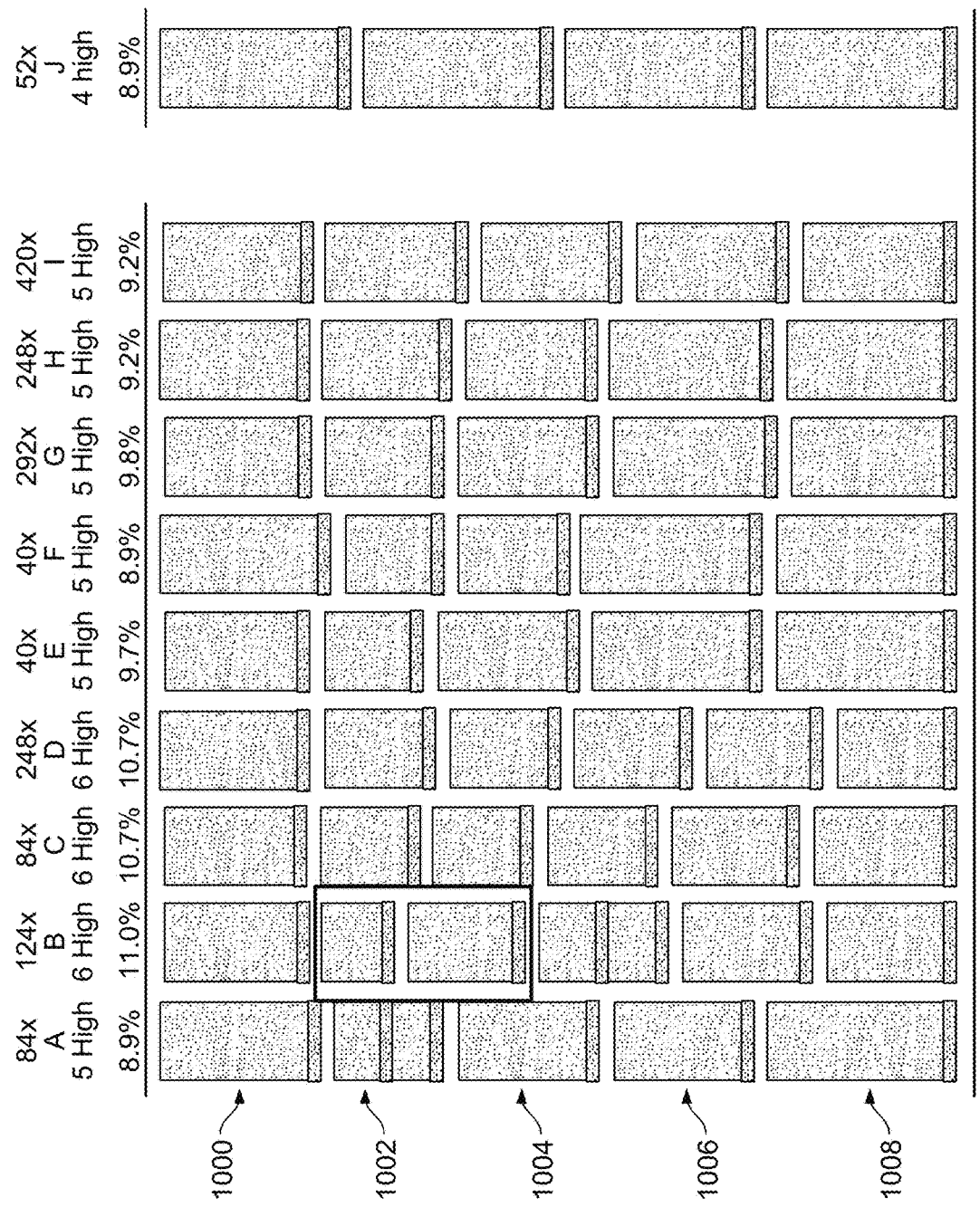
FIG. 10A depicts example final results for rack configurations in an experimental implementation.
Figure 10B:
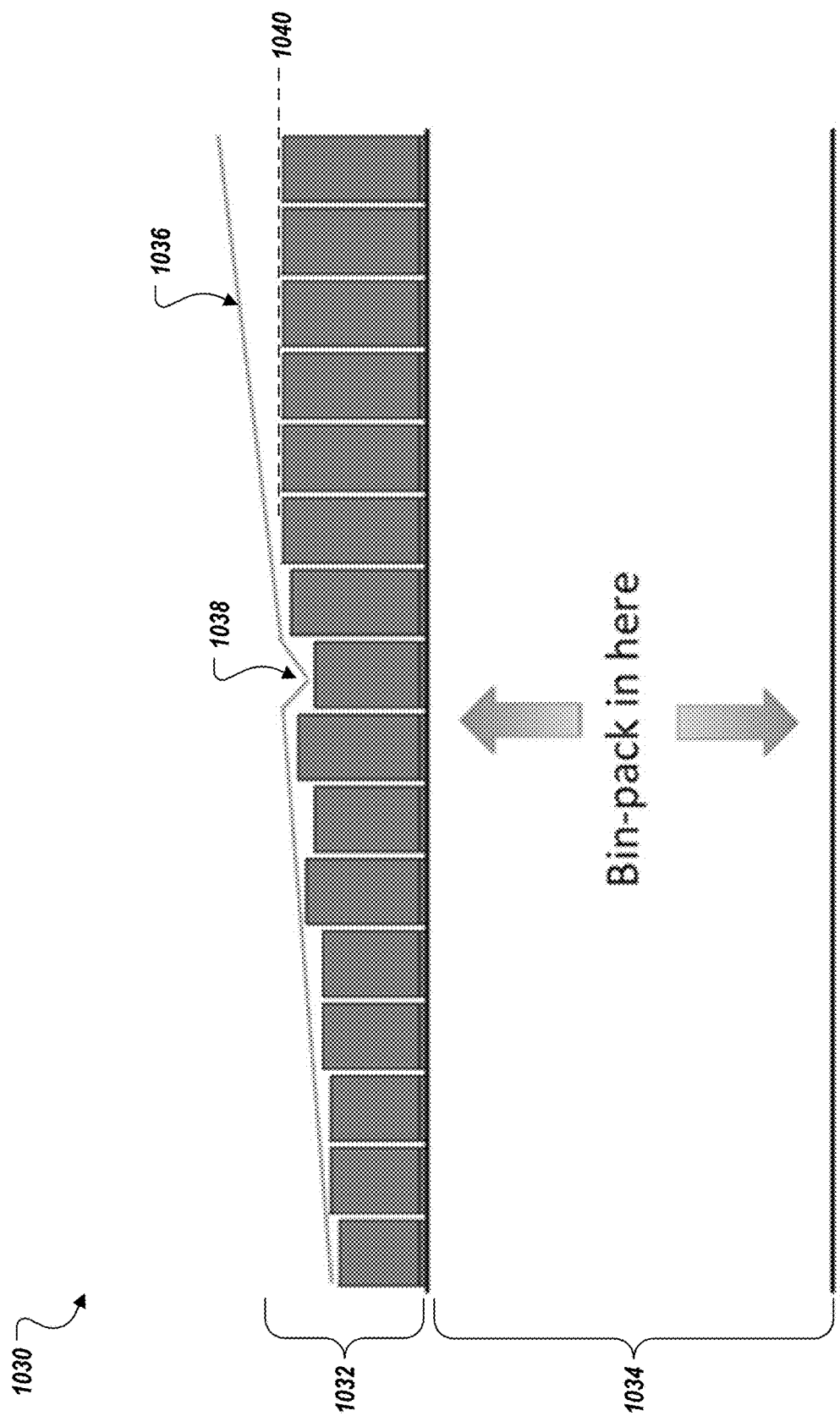
FIG. 10B depicts example segmentation of an example warehouse between a top level and everything else below the top level.

FIG. 10B depicts example segmentation of an example warehouse 1030 between a top level 1032 and everything else 1034 below the top level. As described with regard to step 910, the warehouse can be segmented between the top level 1032, which bounds the height of the top level for some racks based on the roofline 1036 and other ceiling obstructions 1038 (e.g., pipes, HVAC equipment, beams). The distribution for the top level 1032 can be determined using a different algorithm than everything else 1034. For example, the pallet distribution top level 1032 can be determined using a best-fit algorithm, such as a vector-packing algorithm that allocates a pallet size to each top level location that best fits (minimizes unused space), whereas the packing algorithm for everything else 1034 can be different (e.g., bin-packing algorithm, as described with regard to step 914). As indicated by the line 1040, some racks can have unused space between the top of the pallet and the roofline 1036, which can be a product of various limitations (e.g., pallet height restrictions, forklift constraints).

With the pallets in set Z having been placed at the top level, as indicated by step 914, the distribution below the top level can be determined for a "packing distribution" P (vector-packed below the top rail) that consists of the relative complement of the reference distribution and the pallets on top:

$$P = R \setminus Z = C \cup S \setminus Z$$

P is the reference distribution with the pallets on the top level removed. Note that P has m−n elements.

Determining the distribution of rack elevations (defining rack openings) for everything else below the top level (step 914) can be performed, for example, using the following techniques detailed in the pseudo-code below, which can take into account the limitations and features determined in steps 902-908. For instance, let H be the maximum height of a rack in the warehouse. For fixed quantity of items k with heights $h_j \leq H$ for $j \in 1, 2, \ldots k$, the minimum number of racks needed is given as the solution to the following example integer programming problem:

$$\text{minimize } R = \sum_{i=1}^{k} y_i$$

$$\text{subject to } \forall\, i \in 1, \ldots, n \sum_{j=1}^{k} h_j x_{ij} \leq H$$

$$\forall\, j \in 1, \ldots, n \sum_{i=1}^{k} x_{ij} = 1$$

$$y_i = I\left(\sum_{j=1}^{k} x_{ij} > 0\right)$$

$$\vec{y} \in \{0, 1\}$$

$$X \in \{0, 1\}$$

Where $y_i = 1$ if rack i is needed and $x_{ij} = 1$ if item j is placed in rack i.

This formulation can describe both "vector-packing" and "bin-packing" in one dimension. Informally, the objective of this example function can be to minimize the number of racks needed, subject to constraints that the sum of the heights of pallets (+beam height and lift, and other constraints specific to the warehouse as described above) does not violate a height constraint, and that every item is assigned to a rack only once.

This problem can be formulated, for example, using the example tractable problem in graph theory as shown in FIG. 21. As depicted in FIG. 21, an example acrylic multigraph G=(V,A) containing every valid packing pattern represented as a path form the source to the target can be generated. The dotted "loss arcs" represent a penalty for unused space in a bin.

Generate an acyclic multigraph G=(V, A) containing every valid packing pattern represented as a path from the source to the target:

The dotted "loss arcs" represent a penalty for unutilized space in a bin.

The objective function can be:

$$\min z$$

$$\text{s.t.} \sum_{(u,v,i) \in A:\, v=k} f_{uvi} - \sum_{(u,r,i) \in A:\, v=k} f_{uri} = \begin{cases} -z & \text{if } k = s, \\ z & \text{if } k = T, \\ 0 & \text{for } k \in V \setminus \{s, T\}, \end{cases}$$

$$\sum_{(u,v,i) \in A:\, i=j} f_{uvi} \geq b_j, \quad j = 1 \ldots m,$$

$$f_{uvi} \geq 0, \text{ integer}, \, \forall\, (u, v, i) \in A,$$

where (u, v, i) denotes an arc between u and v associated with items of type i, arcs (u, v, i=0) are loss arcs, and $f_{uvi}$ is the amount of flow along the arc (u, v, i).

Informally, the arc flow formulation finds a set of paths through the above-constructed graph that packs every item and minimizes the weight on the loss arcs, and thus minimizes the total unutilized space in the bins containing at least one item. Each individual path through the graph implies the packing pattern for a single bin (rack).

In the experimental implementation, the assignment of pallets to racks were determined by taking the heights of all of the elements of P plus the beam height and lift requirement (max reach—10 inches for the bottom beam), as inputs. For instance, a bin packing algorithm was used with modifications to the distribution to make the computation faster and eliminate false precision. Such modifications included, for example, "scaling down the distribution"—i.e. 10,000 pallets total with 100 pallets at 48" became 100 pallets total with 1 at 48"; and rounding the heights up to the next "peak" in heights so that there were only so many different heights to be packed, generating a more parsimonious solution. Below is an example of the inputs that were used in the experimental implementation:

1
330
169 [# of items to pact note distribution was scaled down and rounded]
32 1
32 1
32 1
32 1
32 1
32 1
43 1
43 1
43 1
43 1
43 1
57 1
57 1
57 1
57 1
57 1
57 1
63 1|

The output that was produced by an example bin packing technique from these inputs in the experimental implementation included the following, which lists which items (by index) are assigned to which racks ("bins"), which are each listed on a separate line:

1×[i=63, i=72, i=149, i=163]
1×[i=64, i=74, i=150, i=164]
1×[i=75, i=78, i=152, i=165]
1×[i=76, i=82, i=154, i=166]
1×[i=77, i=85, i=157, i=167]
1×[i=80, i=86, i=158, i=168]
1×[i=2, i=11, i=34, i=119, i=169]
1×[i=142]
1×[i=35, i=89, i=143, i=146]
1×[i=39, i=96, i=144, i=147]
1×[i=40, i=97, i=145, i=148]
1×[i=41, i=96, i=151, i=153]
1×[i=42, i=102, i=155, i=156]
1×[i=43, i=109, i=159, i=160]
1×[i=60, i=112, i=161, i=162]
1×[i=90, i=94, i=122, i=124]
1×[i=91, i=95, i=123, i=125]
1×[i=92, i=99, i=126, i=130]
1×[i=100, i=105, i=127, i=131]
1×[i=103, i=106, i=128, i=132]
1×[i=104, i=108, i=129, i=133]
1×[i=110, i=111, i=134, i=136]
1×[i=113, i=116, i=135, i=139]
1×[i=114, i=118, i=137, i=140]
1×[i=120, i=121, i=138, i=141]
1×[i=12, i=14, i=26, i=68, i=88]
1×[i=3, i=5, i=7, i=20, i=93, i=107]
1×[i=13, i=15, i=28, i=73, i=101]
1×[i=1, i=4, i=6, i=62, i=115, i=117]
1×[i=8, i=38, i=65, i=70, i=81]
1×[i=9, i=44, i=66, i=71, i=84]
1×[i=10, i=51, i=67, i=83, i=87]
1×[i=16, i=22, i=69, i=79]
1×[i=17, i=23, i=33, i=46, i=47]
1×[i=18, i=24, i=36, i=48, i=50]
1×[i=19, i=25, i=37, i=49, i=53]
1×[i=21, i=27, i=45, i=52, i=54]
1×[i=29, i=30, i=55, i=56, i=57]
1×[i=31, i=32, i=58, i=59, i=61]

Each indexed item from the example output corresponds to a particular pallet, not the pallet's height (i.e. the algorithm returns i, the index for $P_i$, but we are interested in $h(P_1)$). Backing out the rack openings associated with each height can give a list of rack elevations (defining the rack openings) for each of the racks, as depicted in the following example (in which the distribution was scaled down, and then later scaled back up):

| Top-of-beam to top-of-beam opening height | | | | | | |
|---|---|---|---|---|---|---|
| 1 | 2 | 3 | 4 | 5 | 6 | Rack Height |
| 73 | 73 | 91 | 93 | | | 330 |
| 73 | 73 | 91 | 93 | | | 330 |
| 73 | 73 | 91 | 93 | | | 330 |
| 73 | 73 | 91 | 93 | | | 330 |
| 73 | 73 | 91 | 93 | | | 330 |
| 73 | 73 | 91 | 93 | | | 330 |
| 82 | 57 | 68 | 80 | 98 | | 330 |
| 91 | | | | | | 91 |
| 63 | 80 | 91 | 91 | | | 330 |
| 68 | 80 | 91 | 91 | | | 330 |
| 68 | 80 | 91 | 91 | | | 330 |
| 68 | 80 | 91 | 91 | | | 330 |
| 68 | 80 | 91 | 91 | | | 330 |
| 68 | 80 | 91 | 91 | | | 330 |
| 68 | 80 | 91 | 91 | | | 330 |
| 90 | 80 | 85 | 85 | | | 330 |
| 60 | 80 | 85 | 85 | | | 330 |
| 80 | 80 | 85 | 85 | | | 330 |
| 80 | 80 | 85 | 85 | | | 330 |
| 80 | 80 | 85 | 85 | | | 330 |
| 80 | 80 | 85 | 85 | | | 330 |
| 60 | 80 | 85 | 85 | | | 330 |
| 90 | 80 | 35 | 85 | | | 330 |
| 85 | 80 | 35 | 85 | | | 330 |
| 10 | 80 | 65 | 35 | | | 330 |
| 57 | 80 | 63 | 73 | 80 | | 330 |
| 32 | 57 | 43 | 63 | 80 | 30 | 330 |
| 57 | 32 | 63 | 73 | 80 | | 330 |
| 32 | 67 | 32 | 73 | 80 | 20 | 329 |
| 43 | 32 | 73 | 73 | 73 | | 330 |
| 43 | 68 | 73 | 73 | 73 | | 330 |
| 43 | 68 | 73 | 73 | 73 | | 330 |
| 57 | 68 | 73 | 73 | | | 226 |
| 63 | 68 | 68 | 68 | 68 | | 330 |
| 63 | 68 | 68 | 66 | 68 | | 330 |
| 63 | 68 | 68 | 66 | 68 | | 330 |
| 63 | 68 | 68 | 69 | 68 | | 330 |
| 63 | 68 | 68 | 66 | 68 | | 330 |
| 63 | 68 | 68 | 66 | 68 | | 330 |

A Bin-Packer is designed to only be concerned with assigning the items given to it and, as such, the output can be modified to generate an more flexible result. For instance, a bin packer may not attempt to assign empty space left once it has determined the optimal solution. Nor does it consider the "elegance" of the solution. Thus, several changes can be made to the output.

For example, an over-complicated rack configuration can complicate the operator's understanding of his/her facility and the construction contractor's task of reconfiguring the racks. Given that the distribution does change slightly over time, a very complicated configuration may also constitute false precision. While it is beneficial to utilize the cube as effectively as possible, there is some value to simplifying the solution. Parsimony can be increased in the solution in the following three example ways:

(1) For rack openings that appear only once or twice in a solution, including such a rack opening is arguably false precision, as the distribution should be stable to the point that a single rack elevation should not make or break the solution. Such rack openings/elevations with less than a threshold frequency in the solution can be eliminated and replaced a rack opening/elevation that can store larger pallets (e.g., the largest pallets in the distribution, a next larger size), as indicated by step 916.

(2) The opening sizes in some configurations can be increased such that they match other configurations. In contrast, if opening sizes were instead shortened, there would be a risk of being unable to store the inventory in the rack configuration. However, increasing any opening size adds flexibility without imperiling the ability of the rack configuration to fit the distribution. For example, assume there are k racks $O_1, \ldots O_k$ output by the bin-packer. Let each rack configuration be represented by a vector. For each $i \in \{1, \ldots, k\}$, if there exists a $j \neq i$ such that $O_i \leq O_j$, then let $O_i = O_j$ (if each opening on rack $O_i$ is smaller than or equal to each opening on $O_j$, then configure $O_i$ as $O_j$). This procedure can serve to "collapse" the unique rack configurations into a smaller set of unique rack configurations without imperiling our ability to store the items packed by an example Bin-Packer, as indicated by step 918.

(3) The example Bin-Packer can leave one or two racks with a "remainder" of pallets—only one or two, with enough space to store multiple pallets in the empty space, as indicated by step 920. There, the "remainder" racks can be converted into other rack configurations that can hold the pallets that were among the "remainders" assigned by the Bin-Packer. (Such racks can be rare; if they are not, it may materially change the distribution converting them into other types of rack).

Efficiency of the solution can be improved through a few additional modifications. For instance, an example Bin-Packer attempts to pack pallets $\rho_i \in P$ for $i \in \{1, 2, \ldots, m-n\}$. This should be accomplished in a smaller space than is available in the warehouse. If not, then the building can't store the necessary inventory. In the experimental implementation, about 20% of the warehouse was found to be left over after it was packed with the nominal reference distribution.

However, in general it may not be possible to simply scale up the number of racks that are used in a warehouse to fill the empty space. This can skew the distribution because it can effectively scale up the distribution stored below the top level while not scaling up the distribution on the top, resulting in an over-representation of small pallet positions. To address this problem, there are a couple options:

(1) For utilizing empty space for pallets of the same height distribution as the nominal inventory: assume a nominal stack-height for the empty racks (say, 5), implying a total PP count for the warehouse. The reference distribution can be scaled up to that count and the entire process can be repeated—everything from the assignment of pallets to the top level to the bin-packing to the simplification of the racks. The distribution can keep being scaled up or down until one gets to approximately the number of racks in the warehouse, as indicated by step 922.

(2) For using the space as an additional safety factor against changes to the height distribution: Use the empty space for racks that can store any-sized pallet, which can imply a smaller number of very large pallet positions, as indicated by step 924.

In the experimental implementation, both of these example techniques in the paragraph above (steps 922-924) were used. For instance, the distribution was scaled up to the highest level seen under normal circumstances, and then the remaining space was used for racks that stored the tallest pallets that can fit in a truck.

The rack counts in the solution may need to be divisible by a certain integer. For example, some warehouse rack types can use racks built in "bays," which means that all "racks" in the bay are identical. When using such rack types, the count of racks must be divisible by the number of racks in a bay. In the experimental implementation, each discrete rack bay contained a footprint of four pallet positions—two wide by two deep. Any individual bay was configured with a single set of elevations. Accordingly, the count of each mode of rack was configured to be divisible by four. In this example implementation, the rack counts were increased into the "overflow" space to make these adjustments.

One or more of the steps of the technique 900 can be repeated with different and/or additional forklift constraints (926). For example, forklift back rests can be another factor that is taken into account as part of technique 900. For example, a standard forklift back-rest is approximately 40" tall. In the case of a reach-rack, that back-rest is part of the assembly that must enter the rack to manipulate the pallet in the back pallet position. If the rack opening is less than 40", then the back-rest may not fit and the forklift will be unable access the rear pallet position. Reference distributions can be determined to take into account this additional forklift feature enable the ability for forklifts to double-stack in a warehouse, where possible.

In the experimental implementation, a reach-rack was used in the example warehouse and when the example Bin-Packer results implied an opening less than 40", those results were merged with the next largest pallet position on the rack. The intention of doing this was, for example, to provide stacking the two small pallets on top of each other.

FIG. 10A depicts example final results for rack configurations in the experimental implementation, which can be determined using technique 900. The example configurations include racks A-J, which each have a varying number of rack openings and rack shelf elevations. For example, the rack A has 5 openings 1000-1008, with one opening 1004 being designed to store multiple smaller pallets stacked on top of each other. Additionally, the example results indicate a number racks for each of the different types. For instance, the example warehouse is designated to have 84 of rack type A, 124 of rack type B, 84 of rack type C, 248 of rack type D, 40 of rack type E, 40 of rack type F, 292 of rack type G, 248 of rack type H, 420 of rack type I, and 52 of rack type J. Furthermore, in this example, the example rack elevations (defining rack openings for pallets of various heights) are provided for double-deep, full-height racks. The determination of the rack configuration was repeated two more times to configure different rack types in the warehouse, including: (1) Tunnel racks with a 160" tunnel under them to allow for forklift travel; and (2) 3-deep push-back racks that allow 3-deep storage using sleds that are "pushed-back" by the forklift, but need additional lift to facilitate the sleds. The analysis in these alternative scenarios was the same, except for the lift and beam constants and the bin (rack) sizes.

Additional considerations that can be taken into account as part of example technique 900 include forklift selection and weight constraints. Regarding forklift selection, it can be preferable to use existing forklifts at a facility for cost reasons. However, replacing the forklifts at a facility may be a cost-effective way to gain greater storage density (e.g., forklifts with greater reach). If new forklifts are selected, the techniques discussed above can be repeated (every step) using the maximum reach constraints on all models of forklifts compatible with the racks and the warehouse. A forklift is compatible with the rack if the forklift can manipulate pallets into the rack, and a forklift is compatible with the warehouse if the forklift physically fits through the door and clears all obstructions on the dock.

In the experimental implementation, it was concluded that replacing every forklift in the facility would gain approximately 700 pallet positions, and was cost-effective given the economics of the account. The new forklifts were selected to have a 341" max reach.

Regarding weight constraints, the depth of the concrete slab and the strength of the uprights and horizontal members may impose constraints on the maximum weight of product that can be stored in a rack. Those constraints did not apply in the experimental implementation. However, there are products where such constraints may apply, such as bulk drums of frozen fruit, certain block meat products, and concentrated coffee. Such factors can additionally be taken into account as part of the technique 900.

Arranging the Racks

The example Bin-Packers described in this document can provide rack configurations and the number of each type of rack that should be used for particular warehouses. However, such results do not indicate where each type of rack should be placed in the warehouse to further optimize their use. Various criteria, such as roof lines, temperature zones, and/or labor efficiency, can be used to identify optimum placement of racks within a warehouse.

Figure 11:
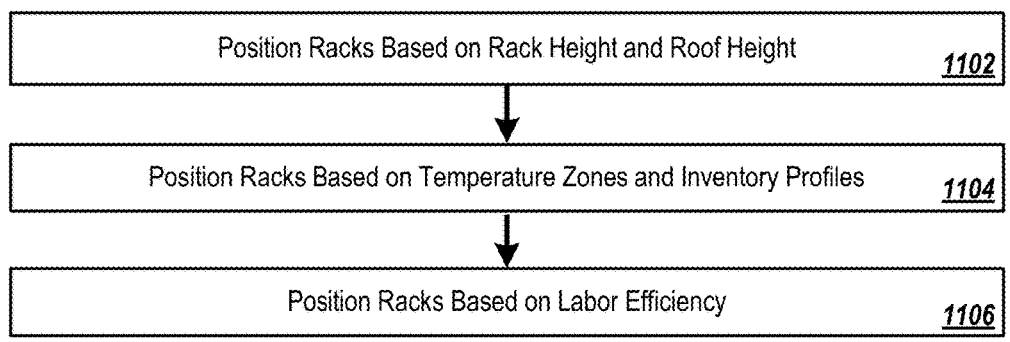
FIG. 11 is a flowchart of an example technique for optimizing the arrangement of different rack types within a warehouse.

FIG. 11 is a flowchart of an example technique 1100 for optimizing the arrangement of different rack types within a warehouse. The technique 1100 is an example of the step 126 described above with regard to FIG. 1 for arranging rack types determined at step 124 within a storage facility. The technique 1100 can be performed by any of a variety of appropriate computing devices, such as the computer system 104 and/or other computing devices/systems.

At 1102, at least a portion of the racks can be positioned at particular locations in the storage facility based on rack height and the roofline. For example, some racks given in the solution are shorter than others and can be better suited for placement on the shorter side of a building to maximize the available space on the top level. At tall sides of a building, the tallest racks can be selected to leave a space on the top that is taller than the tallest pallet in inventory (in contrast, putting shorter racks on the tall side of a building can result in increased un-utilized cube).

At 1104, at least a portion of the racks can be positioned at particular locations in the storage facility based on temperature zones within the facility and inventory profiles identifying appropriate temperature zones for particular pallets, which can dictate the placement of particular racks for those pallets. For example, specific SKUs are stored at or below various threshold temperatures. In such situations, the distribution of heights of the pallets that must be stored in each temperature zone should be able to fit in the rack in sections of the warehouse maintained in compliance with each temperature zone.

For example, in the experimental implementation, approximately 1,200 pallets (10% of the example account) had to be stored at "ice cream" temperatures (−10 F), instead of normal frozen temperatures (0 F). Due to the placement of walls and other obstructions in the example warehouse, the minimum proportion of the warehouse that could be maintained at the ice cream temperature specification was 25%. Accordingly, these temperature zone requirements for the inventory were taken into account to ensure that the ice cream room had enough openings of the right size for the ice cream inventory while not worrying about the distribution of the remaining pallet positions in the ice cream room.

In this example, the ice cream pallets were in a very narrow height range (~72"), so clusters of racks with the appropriately-sized openings in the ice cream room were selected in order to ensure sufficient openings of the right size. The remaining pallet positions in the ice cream room were for any inventory, which could be stored at the ice cream specification or the normal specification.

At 1106, at least a portion of the racks can be positioned based on labor efficiency. For example, warehouses are designed as a compromise between two competing objectives: (1) cube (storage space) optimization; and (2) labor efficiency. Ignoring either can be perilous. For example, cube (storage space) could be maximized by using the deepest racks and filling the aisles all the way to the door, but doing so would require removing a great many pallets every time access to one was needed, making the warehouse onerous to operate. Accordingly, a proper compromise between rack depth and opening-size flexibility can depend on a variety of factors, such as lot sizes, shipment patterns and other appropriate considerations.

In the experimental implementation, a high-velocity case-pick operation was performed and used a certain number of aisles to facilitate case-picking from the bottom opening, precluding the use of deep racks. Within the constraints of double-deep racks, shipment patterns of the SKUs being picked where analyzed to determine how they should be placed in the warehouse, with the objective being to minimize the number of aisles that order-pickers traversed in order to fulfill an average order. To do this, an example mathematical method loosely related to hierarchical clustering and spectral decomposition was used. At the conclusion of this analysis, an assignment of SKUs to front, bottom pallet positions in specific aisles was determined. That assignment is expected to drift over time, so the racks were not arranged precisely around the slotting solution. In all permutations of the slotting solution, the height distribution of products assigned to each aisle was approximately the same as the total height distribution. Thus, racks were assigned to aisles in such a way as to guarantee a variety of opening sizes along the bottom that would facilitate a (roughly) random sampling of the reference distribution.

Figure 12:
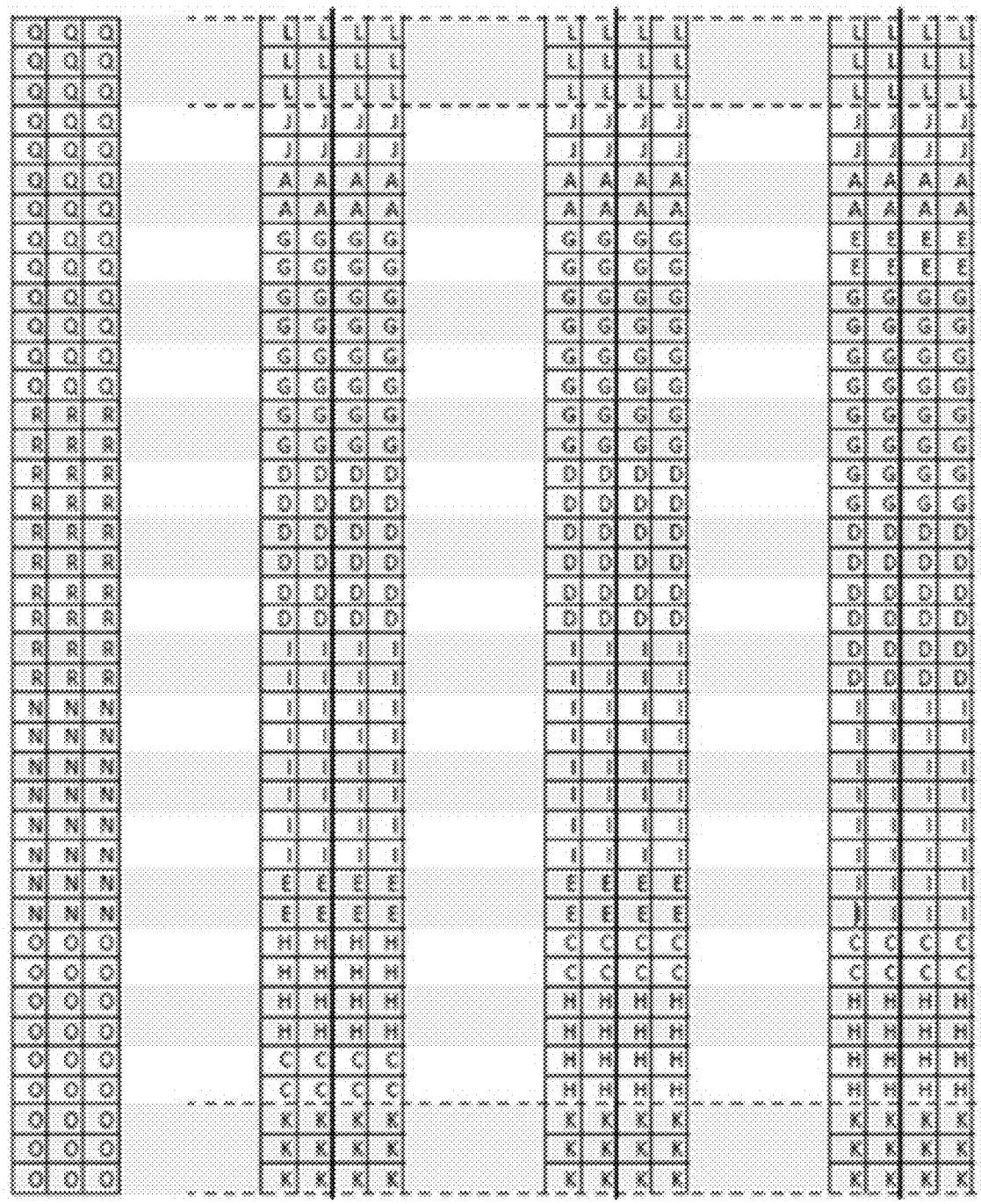
FIG. 12 depicts an example of the final arrangement of different rack modes that were determined for an experimental implementation.

FIG. 12 depicts an example of the final arrangement of different rack types that were determined for the experimental implementation across a storage facility. In this depicted example, the diversity of rack types is identified along each aisle, which was used to accommodate factors like the roof line, temperature zones, and labor efficiency/slotting flexibility, as determined based on the example technique 1100.

Configuring the Warehouse Management System (WMS)

Matching the inventory height distribution to the rack-opening size distribution requires placement of the right-sized pallet into the right-sized rack opening. For example, if a pallet is put into a pallet position with too-large an opening, there are fewer positions for pallets of the height intended to go into the too-large sized opening. If there are enough errors, they can cascade up the rack height distribution, leaving insufficient large pallet positions for large pallets and resulting in pallets of certain sizes not being able to be placed in the rack.

When placing a pallet in a rack opening, a primary objective (vis-a-vis cube optimization) can be to achieve the best fit between that pallet and the pallet position. To minimize wasted cube, the space between the top of the pallet and the bottom of the beam above it can be minimized, which can be performed by comparing available rack openings with the size of the particular pallet that is to be placed in a rack opening.

An additional consideration in deciding where the pallet should be placed is travel time for placing the pallet in the rack. If that pallet is eventually to be placed on the pick line per a slotting plan, it would ideally be placed in a location as near as possible to where it will be needed upon arrival at the warehouse.

Figure 13:
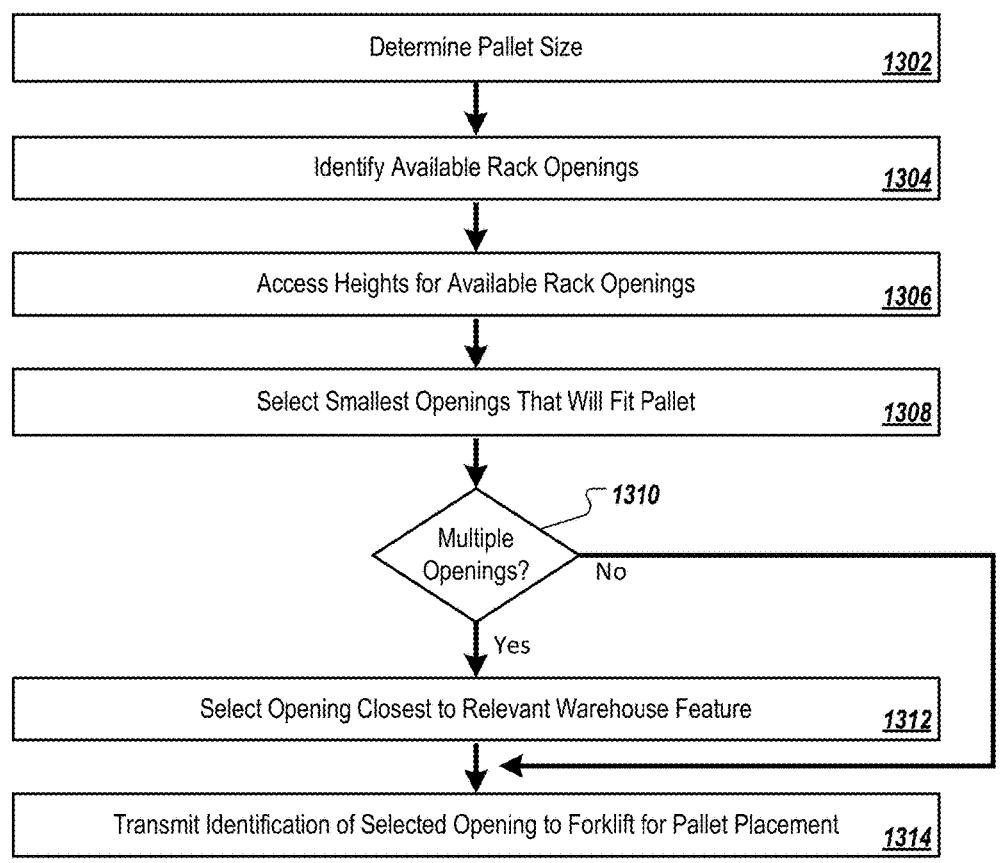
FIG. 13 is a flowchart of an example technique for optimally placing pallets in an optimized rack configuration for a facility.

In the experimental implementation, those considerations led to the following example put-away procedure, implemented in the facility's Warehouse Management System (AEC):
(1) Size the pallet (recall $h(S_{t,i})=[qty(S_{t,i})/ti(p(S_{ti}))] \times caseht(p(S_{t,i}))+P$
(2) Figure out which pallet postions are open
(3) Use a list of the heights of all pallet, positions in the warehouse pick the smallest open position that will fit the pallet as the putaway location
(4) If multiple options (there will be), put the item into the option closest to the SKU's location on the pick line per the slotting plan FIG. 13 is a flowchart of an example technique 1300 for optimally placing pallets in an optimized rack configuration for a facility. The technique 1300 is an example of the step 128 described above with regard to FIG. 1 for configuring the WMS 110 to use the optimized rack configuration and arrangement 118. The technique 1300 can be performed by any of a variety of appropriate computing devices, such as the WMS 110 and/or other computing devices/systems.

At 1302, the size of an incoming pallet can be determined, such as through the techniques described above with regard to step 204. At 1304, rack openings that are currently available to receive a pallet are identified, for example, by referencing a database maintaining current rack usage and allocation. At 1306, height information for the available rack openings can be retrieved and compared to the pallet size. The smallest rack opening(s) that are able to fit the pallet can be selected (1308). In the event that there are multiple available rack openings of the same size that are selected (1309), the rack opening that is the closest to a relevant feature (e.g., pick line, truck bay where the pallet will be loaded/unloaded from a truck) (1310). Once a single opening has been selected, information identifying the location of the selected opening within the warehouse can be transmitted to the forklift (and/or other device/machine placing the pallet) (1312).

Figure 14:
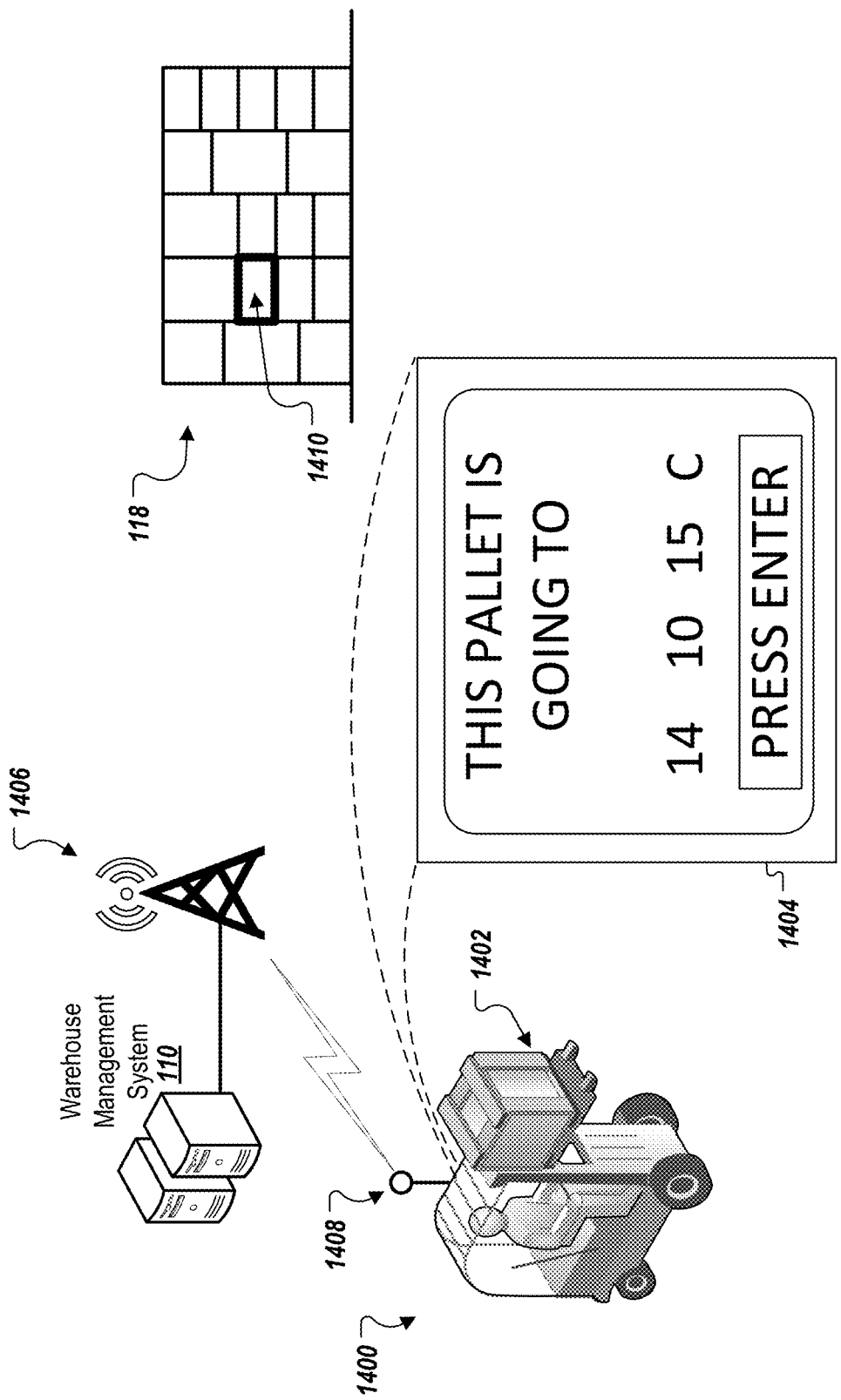
FIG. 14 depicts an example WMS transmitting rack identification information for an optimized rack to an example forklift.

FIG. 14 depicts the example WMS 110 transmitting rack identification information for an optimized rack to an example forklift 1400. In this example, the forklift 1400 is transporting a pallet 1402 for which the WMS 110 has selected an available rack opening 1410 in the example optimized rack 118. The WMS 110 can be equipped with an RF transceiver 1406 over which the rack and rack opening identification information can be transmitted to an RF unit 1408 used by or part of the forklift 1400 (e.g., handheld and/or vehicle-mounted RF units that provide user interfaces for directed put-away according to an optimized rack configuration). An example user interface 1404 with put-away instructions for the forklift operator are depicted.

Stress-Testing the Solution

Potential rack designs can be stress tested using simulations. For example, rack configurations can be represented in simulations that run millions of WMS transactions from the profile at issue through the one or more candidate designs. The objective of the stress testing can be to see how often the rack system "blows out"—meaning, how often a pallet cannot be placed because there are no empty pallet positions large enough to fit the pallet.

Figure 15:
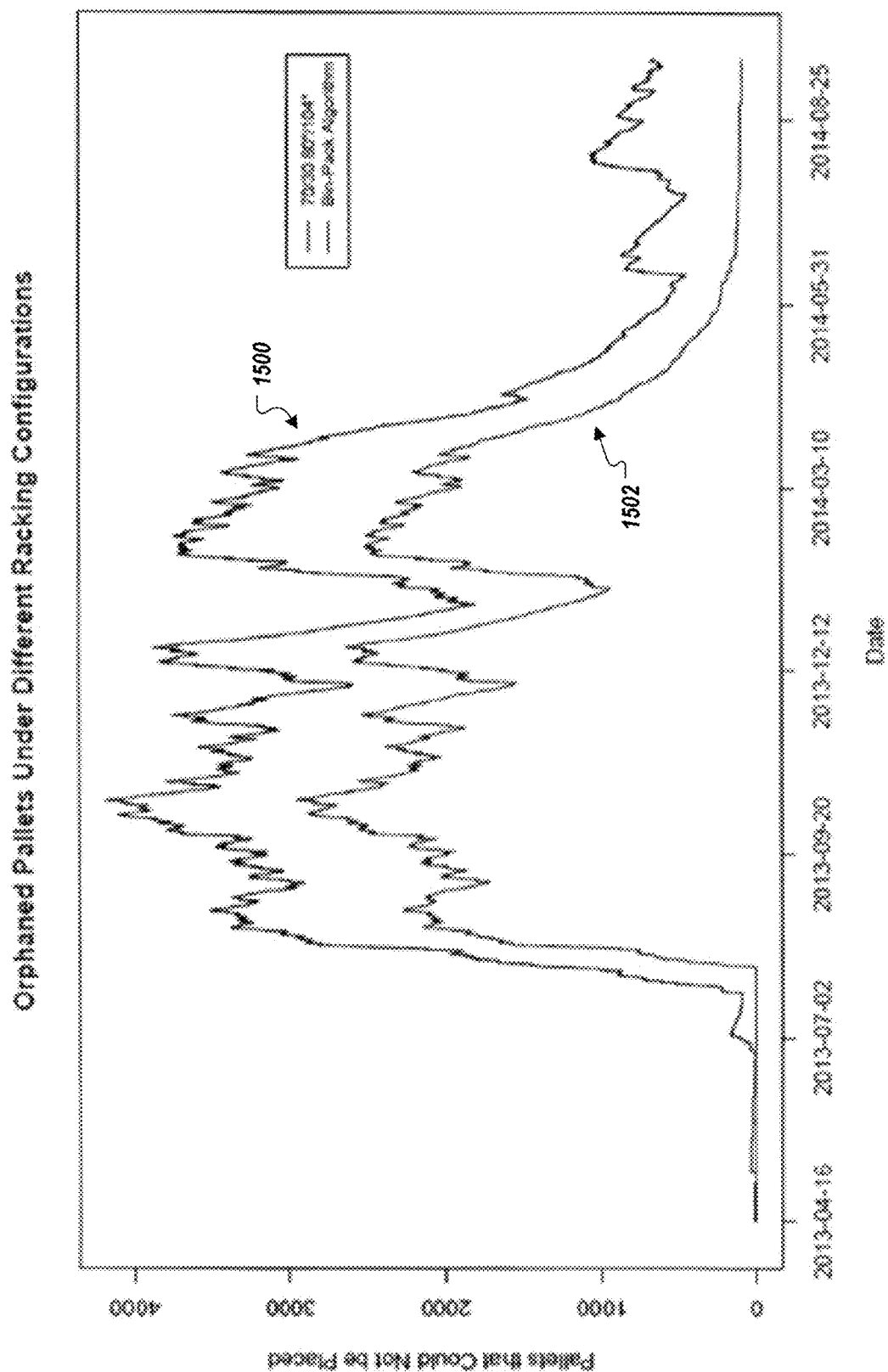
FIG. 15 depicts an example output from a stress test simulation performed on the experimental implementation.

FIG. 15 depicts an example output from a stress test simulation performed on the experimental implementation. These example stress tests revealed the following information about the candidate design under test:

Even during periods without excess inventories, the 70/30 4×104" and 5×80" configuration (the configuration designed under "traditional" methods and represented by line 1500) performed consistently worse, "blowing out" regularly.

The bin-packed configuration (represented by line 1502) afforded more flexibility simply in having more pallet positions. When tidal waves came, it helped to have attempted to minimize excess airspace so that the larger pallet positions were left empty, able to absorb inventory peaks.

An example excess of 4,000 pallets of cheesecake were consistently 72"-80" tall, far off the overall projected profile. So precisely designing racks around this profile raised concerns around what happens when the profile changes. However, the bin-packed configuration still performed better than a standard (not bin-packed) configuration because it had more pallet positions.

The example bin-packed configuration saw approximately 1,200 fewer orphaned pallets, but the bin-pack gained 2,000 PPs. The difference is that the simulation was done without the 3-deep conversion (a separate change unrelated to the bin-packing exercise) and some of the losses were due to example cheesecake products not matching the profile to which the racks were designed.

Figure 16:
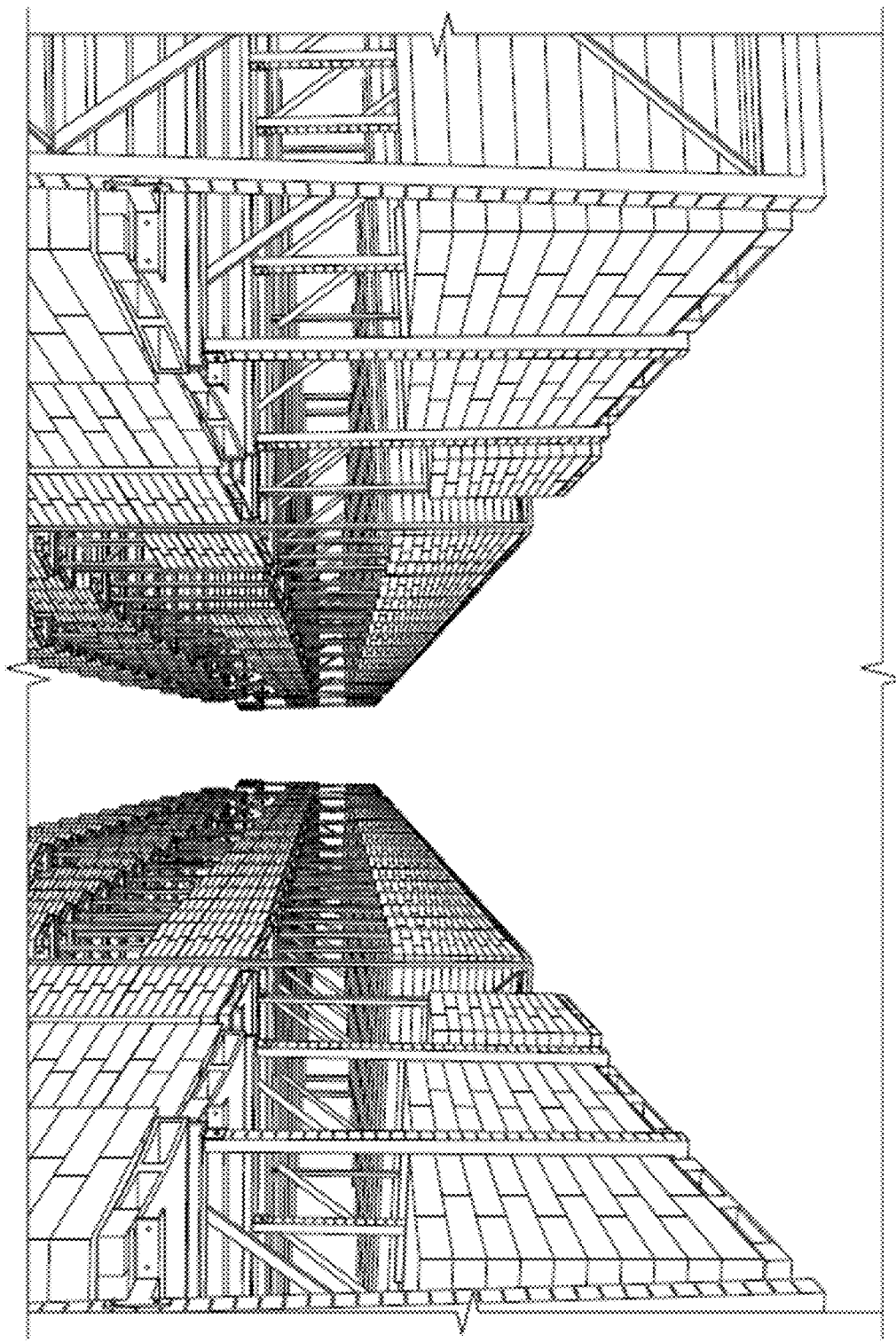
FIGS. 16-17 are photographs that depict traditional warehouse racks that are not optimized for pallet placement.
Figure 17:
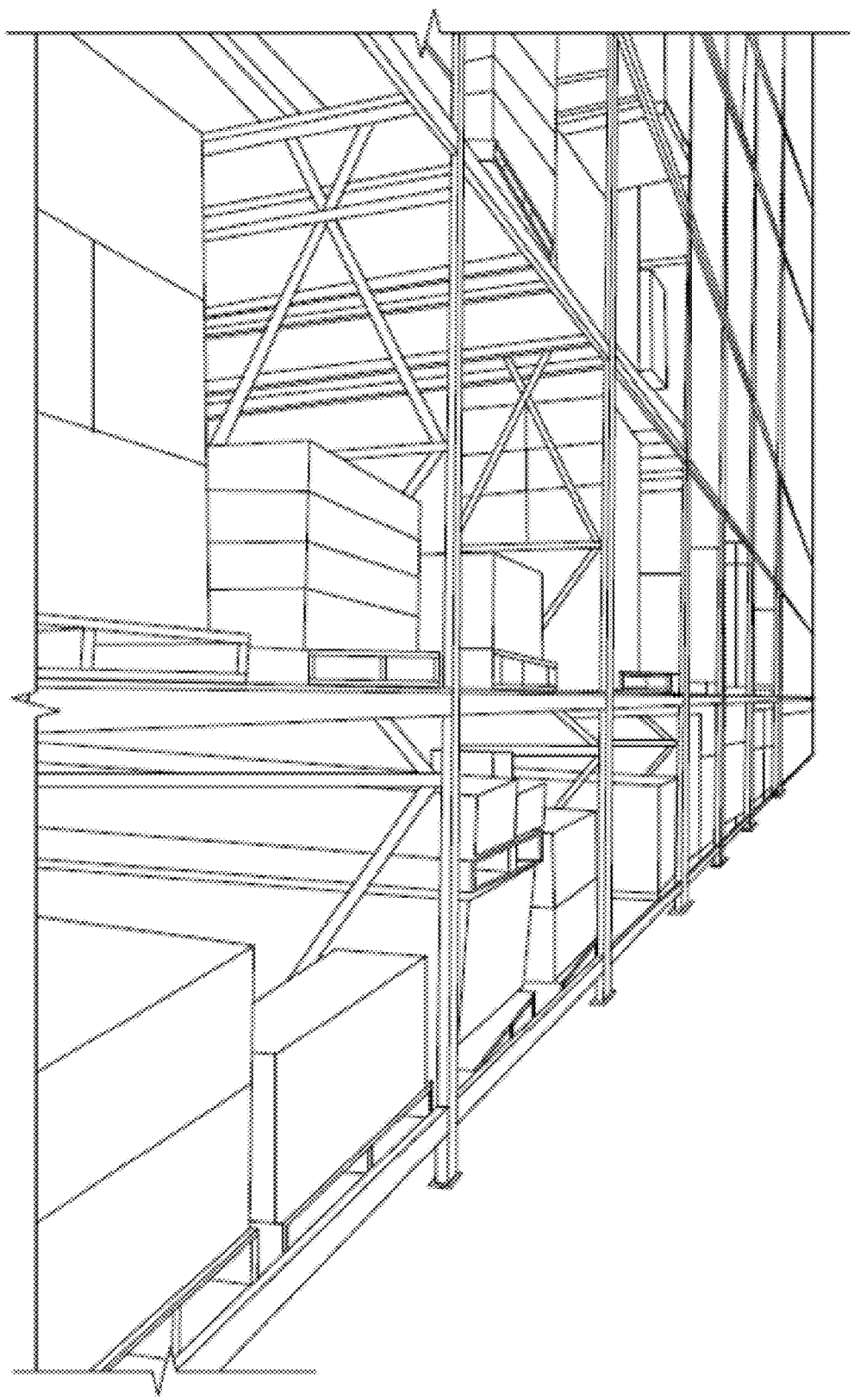

FIGS. 16-17 are examples images of traditional warehouse racks that are not optimized for pallet placement. As depicted in these examples, rack openings have standard heights that do not vary and, as a result, there is unused space between the top of the pallets and the bar above for most of the standard height rack openings.

Figure 18:
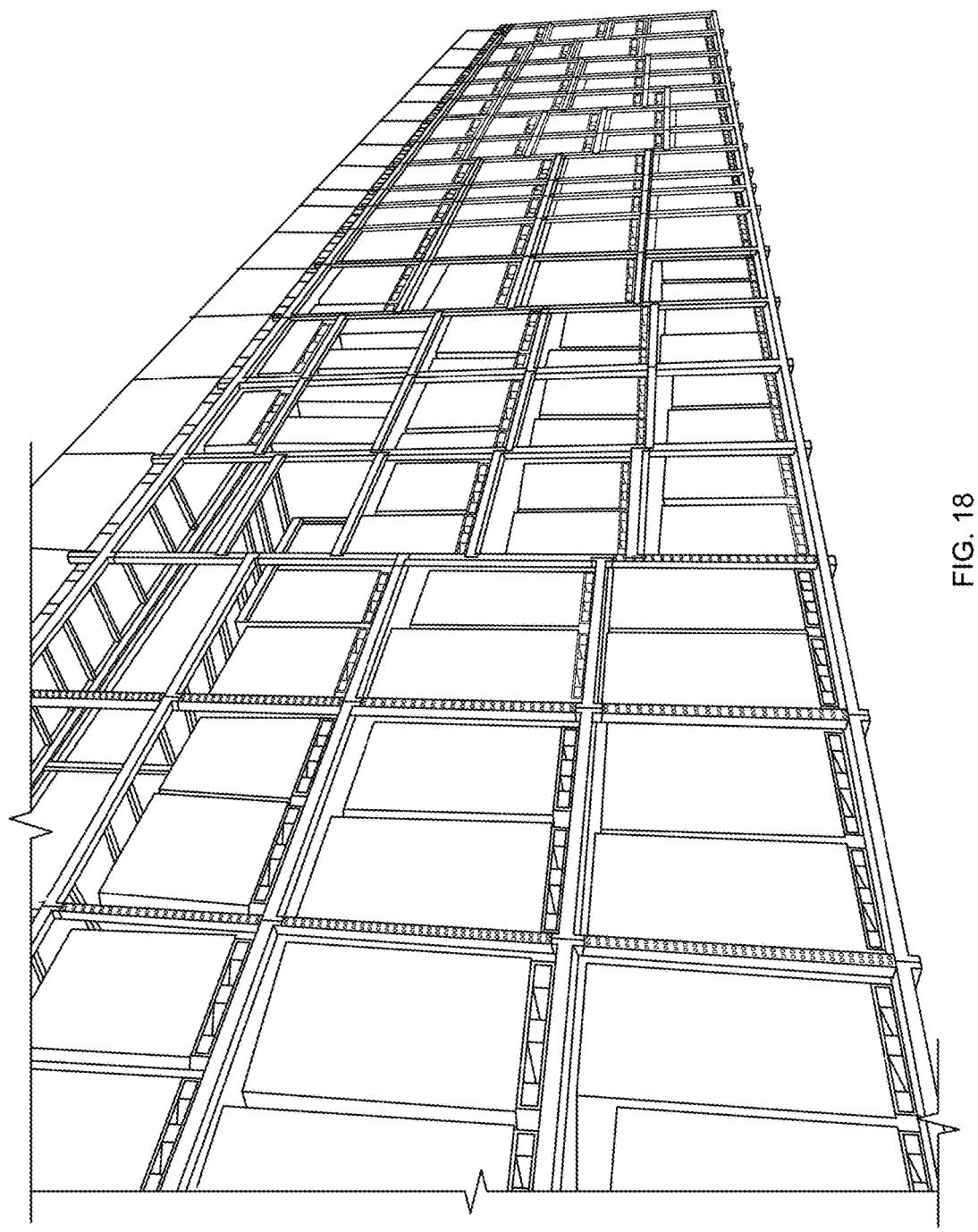
FIG. 18 is a photograph that depicts an example warehouse rack that has been optimized for inventory placement.

FIG. 18 is an image of an example warehouse rack that has been optimized for inventory placement. As depicted, there are several differently sized rack openings in each row and column of the example rack, resulting in a rack with heterogeneously sized rack openings. The rack that is depicted in this example provided an increase in pallet position count, as indicated by less space above each pallet being wasted/unoccupied.

Figure 19:
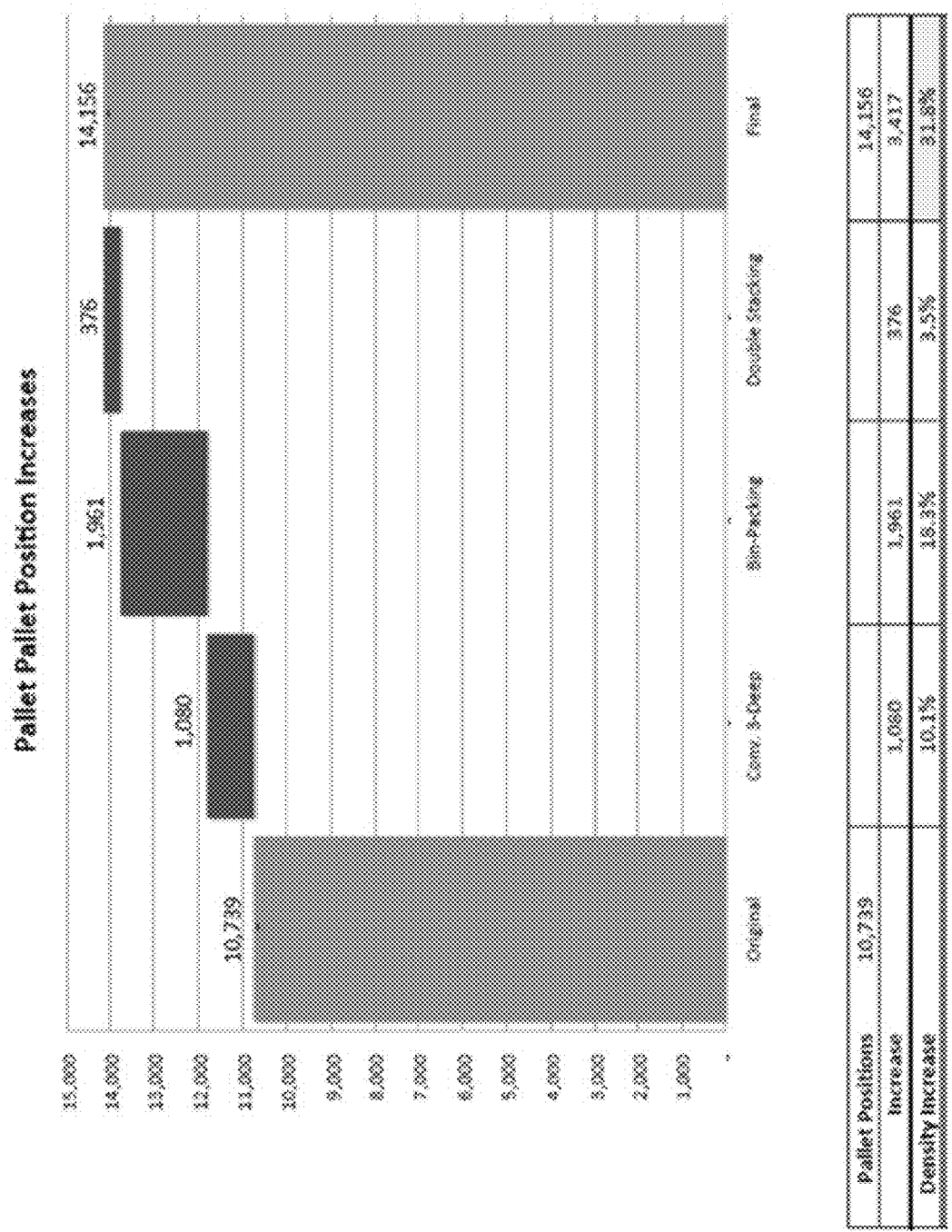
FIG. 19 is a chart detailing an example improvement in space use resulting from transitioning from a traditional rack configuration to an optimized rack configuration.

FIG. 19 is a chart detailing an example improvement in space use resulting from transitioning from a traditional rack configuration (e.g., rack configuration 102, FIGS. 16-17) to an optimized rack configuration (e.g., rack configuration 118, FIG. 18). As detailed in the chart at the bottom of this figure, a 32% increase in pallet position count was identified in this experimental implementation.

The features described above can be performed on any of a variety of appropriate computing devices and/or computer systems. For example, a computer server system (e.g., cloud computer system, network of distributed computer systems) can be programmed to generate optimized rack configurations for a warehouse based on historical inventory data for the warehouse and other appropriate data (e.g., warehouse information, forklift information, worker information, temperature zone information, future scheduled inventory transactions) that is accessible to the computer server system.

Figure 20:
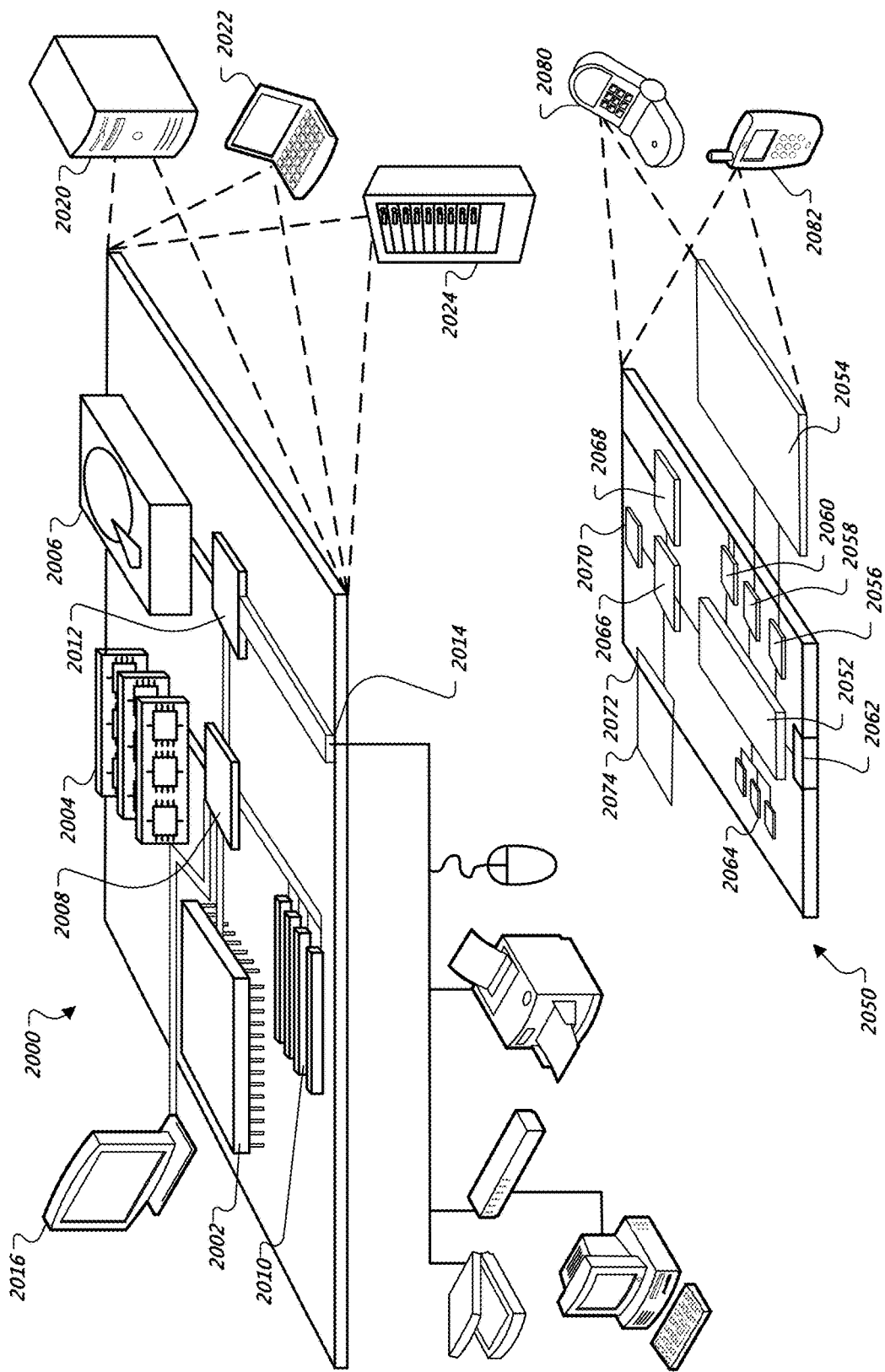
FIG. 20 is a block diagram of example computing devices that may be used to implement the systems and methods described in this document.

FIG. 20 is a block diagram of computing devices 2000, 2050 that may be used to implement the systems and methods described in this document, as either a client or as a server or plurality of servers. Computing device 2000 is intended to represent various forms of digital computers, such as laptops, desktops, workstations, personal digital assistants, servers, blade servers, mainframes, and other appropriate computers. Computing device 2050 is intended to represent various forms of mobile devices, such as personal digital assistants, cellular telephones, smartphones, and other similar computing devices. Additionally computing device 2000 or 2050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT (Thin-Film-Transistor Liquid Crystal Display) display or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052 that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smartphone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system for optimizing storage racks in a refrigerated warehouse, the system comprising:
a plurality of storage racks that each include one or more horizontal bars that are adjustable along a plurality of elevations on the storage racks, placement of the one or more horizontal bars defining a plurality of rack openings within each of the storage racks, wherein the plurality of storage racks include vertical members that are connected by the horizontal bars, each of the horizontal bars extending horizontally from a first vertical member to a second vertical member and defining a horizontal surface on which a pallet rests when stored;
a historical inventory database that is programmed to store historical inventory data for the refrigerated warehouse, the historical inventory data identifying, at least, pallets previously stored in the refrigerated warehouse and times at which the pallets were stored; and
a computer system including one or more processors that are programmed to:
determine historical pallet heights for the pallets in the refrigerated warehouse over a previous time period based, at least in part, on the historical inventory data;
generate a pallet distribution profile for the refrigerated warehouse based on the historical pallet heights and the historical inventory data;
generating a refrigerated warehouse model that represents storage constraints related to the storage racks and equipment to place pallets in the storage racks;
determine a plurality of rack types and a quantity of the rack types for the refrigerated warehouse based, at least in part, on the pallet distribution profile and the refrigerated warehouse model, the plurality of rack types each including a set of rack elevations for the horizontal bars defining a unique combination of sized rack openings for a rack;
designating each of the plurality of storage racks as one of the plurality of rack types to generate a rack arrangement for the refrigerated warehouse; and
outputting information identifying the rack arrangement to be used for implementing the rack arrangement on the plurality of storage racks;
wherein the plurality of storage racks are adjusted to be a plurality of heterogeneous storage racks according to the rack arrangement, resulting in the elevations and size of the rack openings being heterogeneous across the plurality of the heterogeneous storage racks, wherein, for a first heterogeneous storage rack and a second heterogeneous storage rack that are adjacent to each other, the elevations and the size of the rack openings are heterogeneous such that each of one or more first horizontal bars defining first rack openings in the first heterogeneous storage rack are at different elevations from one or more second horizontal bars defining second rack openings in the second heterogeneous storage rack;
forklifts that operate in the refrigerated warehouse to place and retrieve pallets from the plurality of heterogeneous storage racks, wherein the forklifts each include:
an RF transceiver to receive heterogeneous rack opening identifications in the plurality of heterogeneous storage racks,
a display to visually output the heterogeneous rack openings identifications to a forklift operator, directing the forklift operator to a particular heterogeneous rack opening in the plurality of heterogeneous storage racks.

2. The system of claim 1, wherein generating the pallet distribution profile comprises:
determining distributions of the pallet heights over time based on the historical inventory data;
evaluating a level of variation in the distributions over time;
in response to determining that the level of variation exceeds a threshold level, aggregating and adjusting the distributions to generate the pallet distribution profile using a cumulative sum technique that accounts for the level of variation over time.

3. The system of claim 2, wherein the cumulative sum technique comprises:
for each of the distributions and for each pallet height within the distributions, generating an aggregate value comprising a sum of an aggregate value for a next taller pallet and a value for the pallet in the distribution;
for each of the pallet heights, identifying a maximum aggregate value across the distributions; and
determining, for the pallet distribution profile, values for each of the pallet heights by determining, in sequential order from a tallest pallet to a shortest pallet, a value for a particular pallet as the difference between the maximum aggregate values for the next taller pallet and the particular pallet.

4. The system of claim 1, wherein the pallet distribution profile is generated further based on one more safety factors to protect against inventory surges and changes to pallet distributions.

5. The system of claim 4, wherein the safety factors include one or more of: an inherent excess of pallet positions in the refrigerated warehouse, an excess percentage of tall pallet positions, and excess lift at every pallet positions.

6. The system of claim 1, wherein the storage constraints include forklift performance features and limitations, roof and ceiling equipment constraints in the refrigerated warehouse, and rack constraints,
wherein the roof and ceiling equipment constraints define maximum storage heights at locations throughout the refrigerated warehouse based on, at least, refrigeration equipment that is suspended from the ceiling of the refrigerated warehouse, the refrigeration equipment including ammonia pipes and refrigeration coils.

7. The system of claim 6, wherein the forklift performance features and limitations define a maximum reach for the forklifts operating in the refrigerated warehouse, presence of outrigger features and dimensions thereof for the forklifts operating in the refrigerated warehouse, and upright heights for the forklifts operating in the warehouse.

8. The system of claim 6, wherein the roof and ceiling equipment constraints include the minimum height above each of the heterogeneous storage racks defined by the roof or nearest ceiling equipment.

9. The system of claim 6, wherein the rack constrains comprise vertical height of the horizontal bar and lift spacing needed to place and remove pallets from the heterogeneous storage racks.

10. The system of claim 1, further comprising:
a refrigerated warehouse management system that includes:
an RF transceiver to transmit the heterogeneous rack opening identifications to the forklifts; and
a warehouse management computer system that is programmed to perform the following operations to direct the equipment on the placement of a new pallet in the storage racks, as optimized by the rack arrangement:
determining a height of the new pallet;
identifying heterogeneous rack openings that are available for the new pallet;
selecting one or more smallest heterogeneous rack openings into which the new pallet will fit;
in response to selecting a plurality of smallest heterogeneous rack openings, selecting a particular heterogeneous rack opening from the plurality of smallest heterogeneous rack openings based on the locations of the plurality of the smallest heterogeneous rack openings with the refrigerated warehouse; and
providing information identifying the particular heterogeneous rack opening to the RF transceiver of the refrigerated warehouse management system for transmission to one or more of the forklifts for placement of the new pallet within the plurality of heterogeneous storage racks.

11. A method for optimizing storage racks in a refrigerated warehouse, the method comprising:
accessing, by a computer system, historical inventory data for the refrigerated warehouse that identifies, at least, pallets previously stored in the refrigerated warehouse and times at which the pallets were stored;
determining, by the computer system, historical pallet heights for the pallets in the refrigerated warehouse over a previous time period based, at least in part, on the historical inventory data;
generating, by the computer system, a pallet distribution profile for the refrigerated warehouse based on the historical pallet heights and the historical inventory data;
generating, by the computer system, a refrigerated warehouse model that represents storage constraints related to storage racks and equipment to place pallets in the storage racks, wherein the storage racks each include one or more horizontal bars that are adjustable along a plurality of elevations on the storage racks, placement of the one or more horizontal bars defining a plurality of rack openings within each of the storage racks, wherein the plurality of storage racks include vertical members that are connected by the horizontal bars, each of the horizontal bars extending horizontally from a first vertical member to a second vertical member and defining a horizontal surface on which a pallet rests when stored;
determining, by the computer system, a plurality of rack types and a quantity of the rack types for the refrigerated warehouse based, at least in part, on the pallet distribution profile and the refrigerated warehouse model, the plurality of rack types each including a set of rack elevations for the horizontal bars defining a unique combination of sized rack openings for a rack;
designating, by the computer system, each of the plurality of storage racks as one of the plurality of rack types to generate a rack arrangement for the refrigerated warehouse; and outputting, by the computer system, information identifying the rack arrangement to be used for implementing the rack arrangement on the plurality of storage racks;
wherein the plurality of storage racks are adjusted to be a plurality of heterogeneous storage racks according to the rack arrangement, resulting in the elevations and size of the rack openings being heterogeneous across the plurality of the heterogeneous storage racks, wherein, for a first heterogeneous storage rack and a second heterogeneous storage rack that are adjacent to each other, the elevations and the size of the rack openings are heterogeneous such that each of one or more first horizontal bars defining first rack openings in the first heterogeneous storage rack are at different elevations from one or more second horizontal bars defining second rack openings in the second heterogeneous storage rack;
wherein forklifts operating in the refrigerated warehouse to place and retrieve pallets from the plurality of heterogeneous storage racks each include:
an RF transceiver to receive heterogeneous rack opening identifications in the plurality of heterogeneous storage racks,
a display to visually output the heterogeneous rack openings identifications to a forklift operator, directing the forklift operator to a particular heterogeneous rack opening in the plurality of heterogeneous storage racks.

12. The method of claim 11, wherein generating the pallet distribution profile comprises:
determining distributions of the pallet heights over time based on the historical inventory data;
evaluating a level of variation in the distributions over time;
in response to determining that the level of variation exceeds a threshold level, aggregating and adjusting the distributions to generate the pallet distribution profile using a cumulative sum technique that accounts for the level of variation over time.

13. The method of claim 12, wherein the cumulative sum technique comprises:
for each of the distributions and for each pallet height within the distributions, generating an aggregate value comprising a sum of an aggregate value for a next taller pallet and a value for the pallet in the distribution;
for each of the pallet heights, identifying a maximum aggregate value across the distributions; and
determining, for the pallet distribution profile, values for each of the pallet heights by determining, in sequential order from a tallest pallet to a shortest pallet, a value for a particular pallet as the difference between the maximum aggregate values for the next taller pallet and the particular pallet.

14. The method of claim 11, wherein the pallet distribution profile is generated further based on one more safety factors to protect against inventory surges and changes to pallet distributions.

15. The method of claim 14, wherein the safety factors include one or more of: an inherent excess of pallet positions in the refrigerated warehouse, an excess percentage of tall pallet positions, and excess lift at every pallet positions.

16. The method of claim 11, wherein the storage constraints include forklift performance features and limitations, roof and ceiling equipment constraints in the refrigerated warehouse, and rack constraints;
wherein the roof and ceiling equipment constraints define maximum storage heights at locations throughout the refrigerated warehouse based on, at least, refrigeration equipment that is suspended from the ceiling of the refrigerated warehouse, the refrigeration equipment including ammonia pipes and refrigeration coils.

17. The system of claim 1, wherein:

the historical inventory data comprises historical inventory data for a plurality of distinct parties that each use the refrigerated warehouse and that each have distinct inventory needs over time unrelated to inventory needs of others of the plurality of distinct parties, the pallet distribution profile for the refrigerated warehouse is comprised of a plurality of pallet distribution profiles for the plurality of distinct parties, and the rack arrangement is optimized to accommodate the plurality of pallet distribution profiles for the plurality of distinct parties for all projected future inventory levels across projected future times for the plurality of distinct parties within the refrigerated warehouse.

18. The method of claim 11, wherein:

the historical inventory data comprises historical inventory data for a plurality of distinct parties that each use the refrigerated warehouse and that each have distinct inventory needs over time unrelated to inventory needs of others of the plurality of distinct parties, the pallet distribution profile for the refrigerated warehouse is comprised of a plurality of pallet distribution profiles for the plurality of distinct parties, and the rack arrangement is optimized to accommodate the plurality of pallet distribution profiles for the plurality of distinct parties for all projected future inventory levels across projected future times for the plurality of distinct parties within the refrigerated warehouse.

* * * * *